United States Patent
Suzuki et al.

(10) Patent No.: US 12,145,407 B2
(45) Date of Patent: Nov. 19, 2024

(54) TIRE WEAR DETECTION APPARATUS

(71) Applicants: DENSO CORPORATION, Kariya (JP); SOKEN, INC., Nisshin (JP)

(72) Inventors: Yoichiro Suzuki, Nisshin (JP); Takatoshi Sekizawa, Kariya (JP)

(73) Assignees: DENSO CORPORATION, Kariya (JP); SOKEN, INC., Nisshin (JP)

( * ) Notice: Subject to any disclaimer, the term of this patent is extended or adjusted under 35 U.S.C. 154(b) by 427 days.

(21) Appl. No.: 17/343,018

(22) Filed: Jun. 9, 2021

(65) Prior Publication Data

US 2021/0291597 A1 Sep. 23, 2021

Related U.S. Application Data

(63) Continuation of application No. PCT/JP2019/048739, filed on Dec. 12, 2019.

(30) Foreign Application Priority Data

| Dec. 13, 2018 | (JP) | 2018-233412 |
| Mar. 27, 2019 | (JP) | 2019-061221 |
| Dec. 12, 2019 | (JP) | 2019-224168 |

(51) Int. Cl.
*B60C 11/24* (2006.01)
*G01M 17/02* (2006.01)
(Continued)

(52) U.S. Cl.
CPC ......... *B60C 11/246* (2013.01); *G01M 17/025* (2013.01); *G07C 5/02* (2013.01); *H04Q 9/00* (2013.01); *G06V 20/56* (2022.01)

(58) Field of Classification Search
CPC .. B60C 11/246; B60C 11/243; G01M 17/025; G07C 5/02; G07C 5/0816; H04Q 9/00; G06V 20/56
See application file for complete search history.

(56) References Cited

U.S. PATENT DOCUMENTS

| 6,278,361 B1 * | 8/2001 | Magiawala ......... B60C 23/0494 73/11.04 |
| 2003/0006893 A1 * | 1/2003 | Dunbridge ............ G01M 17/04 340/444 |

(Continued)

FOREIGN PATENT DOCUMENTS

| JP | 2003054229 A | 2/2003 |
| JP | 2004175276 A | 6/2004 |

(Continued)

OTHER PUBLICATIONS

JP-2007153034-A_English Translation (Year: 2007).*

*Primary Examiner* — Rachid Bendidi
*Assistant Examiner* — Dana F Artimez
(74) *Attorney, Agent, or Firm* — Harness, Dickey & Pierce, P.L.C.

(57) ABSTRACT

A tire wear detection apparatus includes a tire side device and a vehicle body side system. The tire side device includes a vibration detection unit, a vehicle speed estimation unit, a signal processing unit, and a first data communication unit. The vibration detection unit is configured to output a detection signal. The vehicle speed estimation unit is configured to estimate the vehicle speed. The signal processing unit is configured to generate wear data. The vehicle body side system includes a second data communication unit and a controller. The controller has a wear determination unit configured to determine a tire wear state based on the wear data. The signal processing unit is configured to acquire the detection signal within a detection signal acquiring range, and calculate a level value of a vibration level of the acquired detection signal within a predetermined frequency range based on a natural frequency of the tire.

14 Claims, 11 Drawing Sheets

(51) Int. Cl.
*G07C 5/02* (2006.01)
*H04Q 9/00* (2006.01)
*G06V 20/56* (2022.01)

(56) References Cited

U.S. PATENT DOCUMENTS

| | | | |
|---|---|---|---|
| 2004/0217853 A1 | 11/2004 | Dunbridge et al. | |
| 2005/0253697 A1* | 11/2005 | Taguchi | B60C 23/0416 |
| | | | 340/447 |
| 2010/0199756 A1 | 8/2010 | Hanatsuka | |
| 2018/0003593 A1 | 1/2018 | Siegel et al. | |
| 2018/0079262 A1* | 3/2018 | Masago | B60C 11/243 |
| 2019/0279497 A1 | 9/2019 | Sekizawa et al. | |

FOREIGN PATENT DOCUMENTS

| | | | | |
|---|---|---|---|---|
| JP | 2007153034 A | * | 6/2007 | B60C 11/24 |
| JP | 2009018667 A | | 1/2009 | |
| JP | 2018016300 A | | 2/2018 | |

* cited by examiner

NORMALIZED INTEGRAL VALUE

TIRE WEAR DETECTION APPARATUS

CROSS REFERENCE TO RELATED APPLICATION

The present application is a continuation application of International Patent Application No. PCT/JP2019/048739 filed on Dec. 12, 2019, which designated the U.S. and claims the benefit of priority from Japanese Patent Applications No. 2018-233412 filed on Dec. 13, 2018, No. 2019-061221 filed on Mar. 27, 2019, and No. 2019-224168 filed on Dec. 12, 2019. The entire disclosures of all of the above applications are incorporated herein by reference.

TECHNICAL FIELD

The present disclosure relates to a tire wear detection apparatus configured to detect a tire wear state based on a wear data of a tire.

BACKGROUND

A general tire wear detection apparatus extracts, from an acceleration waveform, a step-in region that includes a peak appearing when a rubber block of a tire comes into contact with a road surface, and a kick-out region that includes a peak appearing when the rubber block comes out of contact with the road surface. The tire wear detection apparatus detects the tire wear state from differences of frequency characteristics obtained by frequency decomposition of the extracted acceleration waveform.

SUMMARY

A tire wear detection apparatus according to a first aspect of the present disclosure is configured to detect a tire wear state. The tire wear detection apparatus includes: a tire side device disposed on each of a plurality of tires of a vehicle, the tire side device including a vibration detection unit configured to output a detection signal according to a magnitude of vibration of a corresponding tire of the plurality of tires, a vehicle speed estimation unit configured to estimate a vehicle speed that is a speed of the vehicle, a signal processing unit configured to generate wear data indicating a wear state of the corresponding tire that appears in a waveform of the detection signal, and a first data communication unit configured to transmit the wear data; and a vehicle body side system disposed in a vehicle body and including a second data communication unit configured to receive the wear data, and a controller that has a wear determination unit configured to determine the tire wear state based on the wear data. The signal processing unit is configured to determine a detection signal acquiring range of the detection signal based on the vehicle speed estimated by the vehicle speed estimation unit, acquire the detection signal within the detection signal acquiring range, and calculate, as the wear data, a level value of a vibration level of the acquired detection signal within a predetermined frequency range that is based on a natural frequency of the corresponding tire including a rubber block of the corresponding tire.

A tire wear detection apparatus of a second aspect of the present disclosure is configured to detect a tire wear state. The tire wear detection apparatus includes: a vibration detection unit configured to output a detection signal according to magnitude of vibration of a tire; a vehicle speed estimation unit configured to estimate a vehicle speed that is a speed of a vehicle; a signal processing unit configured to generate wear data indicating a wear state of the tire that appears in a waveform of the detection signal; and a controller including a wear determination unit configured to determine the tire wear state based on the wear data. The signal processing unit is configured to determine a detection signal acquiring range of the detection signal based on the vehicle speed estimated by the vehicle speed estimation unit, acquire the detection signal within the detection signal acquiring range, and calculate, as the wear data, a level value of a vibration level of the acquired detection signal within a predetermined frequency range that is based on a natural frequency of the tire including a rubber block of the tire.

EMBODIMENTS

Comparative Example

Figure 1:
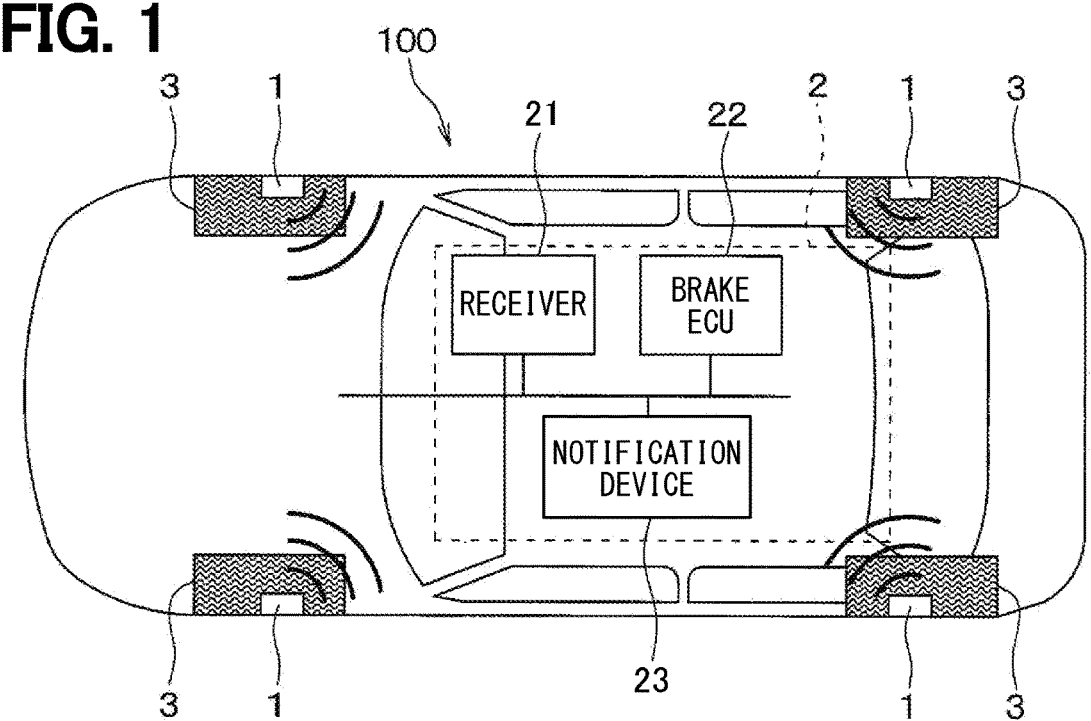
FIG. 1 is a diagram illustrating a block configuration of a tire wear detection apparatus according to at least one embodiment of the present disclosure.

A tire wear detection apparatus of a comparative example extracts, from an acceleration waveform, a step-in region that includes a peak appearing when a rubber block of a tire comes into contact with a road surface, and a kick-out region that includes a peak appearing when the rubber block comes out of contact with the road surface. The tire wear detection apparatus detects the tire wear state from differences of frequency characteristics obtained by frequency decomposition of the extracted acceleration waveform.

However, the tire wear detection apparatus of the comparative example requires accurate detection of the pulse of the acceleration waveform appearing when the block of the tire comes into contact with the road surface. Accordingly, when a disturbance due to the actual condition of the road surface, such as a rough road surface, is input, it may be difficult to accurately extract the acceleration waveform in the step-in and kicking-out regions. In such a case, the detection accuracy of tire wear by the tire wear detection apparatus may be reduced.

Hereinafter, embodiments of the present disclosure will be described with reference to the drawings. In the following embodiments, the same or equivalent parts are denoted by the same reference numerals.

First Embodiment

A tire system 100 having a tire wear state detecting function according to the present embodiment will be described with reference to FIGS. 1 to 10. The tire system 100 according to the present embodiment includes a tire side device 1 and a vehicle body side system 2. In the tire system 100, the tire side device 1 transmits information about tire wear to the vehicle body side system 2, and the vehicle body side system 2 determines a tire wear state and notifies it of the user.

Figure 2:
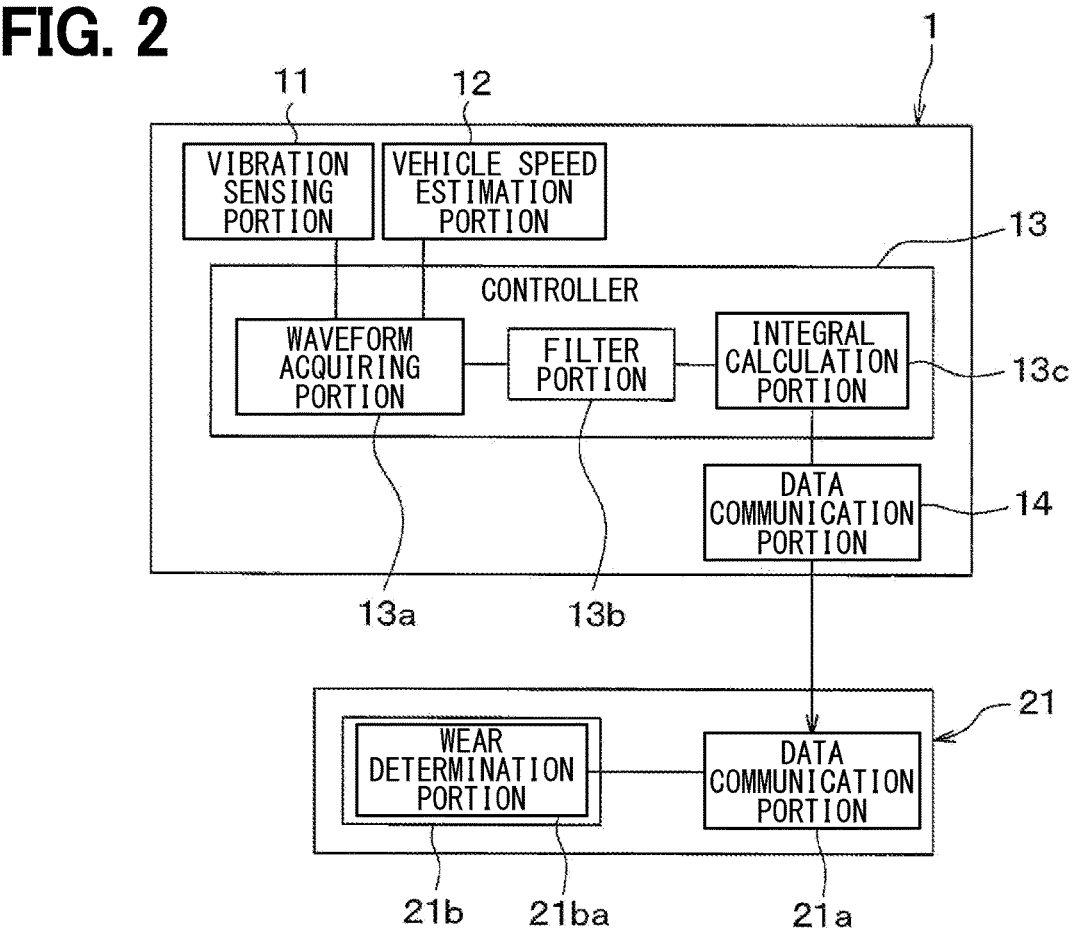
FIG. 2 is a block diagram illustrating a tire side device and a receiver.

As shown in FIG. 1 and FIG. 2, the tire system 100 includes the tire side devices 1 disposed on wheels and the vehicle body side system 2 which includes various components provided in the vehicle body. The vehicle body side system 2 includes a receiver 21, an electronic control unit for brake control (hereinafter referred to as a brake ECU) 22, a notification device 23 and the like. In the tire system 100, a portion configured to realize the detecting function of the tire wear state corresponds to a tire wear detection apparatus. In the present embodiment, the tire side device 1 and the receiver 21 of the vehicle body side system 2 operate as the tire wear detection apparatus. Hereinafter, details of each part constituting the tire side device 1 and the vehicle body side system 2 will be described.

Figure 3:
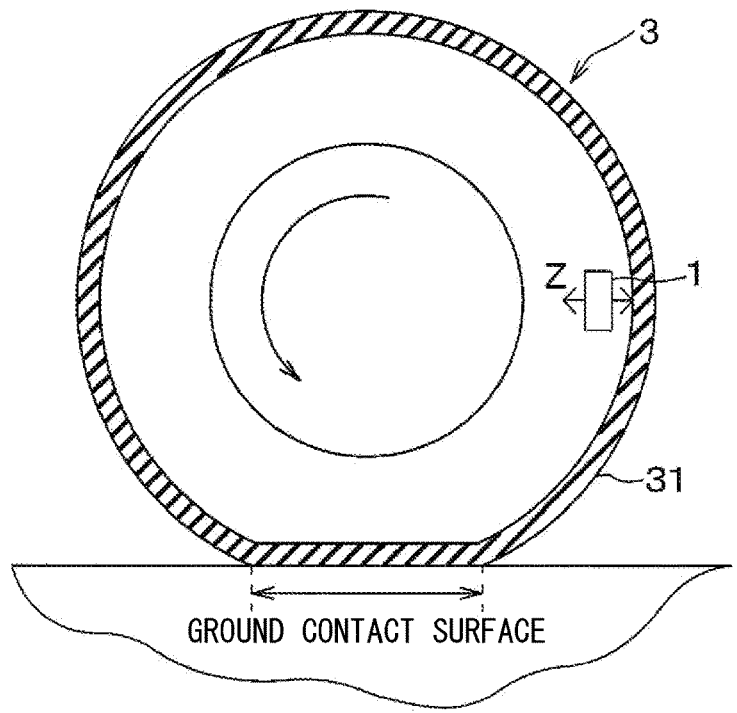
FIG. 3 is a schematic view showing a cross section of a tire to which the tire side device is attached.

First, the tire side device 1 will be described. As shown in FIG. 2, the tire side device 1 includes a vibration sensing portion 11, a vehicle speed estimation portion 12, a controller 13, and a data communication portion 14. For example, as shown in FIG. 3, the tire side device 1 is provided on a back surface side of a tread 31 of each tire 3.

The vibration sensing portion 11 is configured as a vibration detection unit for detecting vibrations applied to the tire 3. For example, the vibration sensing portion 11 is provided with an acceleration sensor. In the present embodiment, the vibration sensing portion 11 outputs a detection signal of acceleration as the detection signal, which corresponds to magnitude of the vibration in a radial direction of a circular trajectory drawn up by the tire side device 1 at the time of rotation of the tire 3, that is, a radial direction of the tire 3 indicated by an arrow Z in FIG. 3. More specifically, the vibration sensing portion 11 generates as the detection signal an output voltage, which is positive in one direction and negative in the opposite direction of two directions indicated with the arrow Z. For example, the vibration sensing portion 11 detects acceleration at each predetermined sampling period, which is set to a period shorter than one rotation of the tire 3, and outputs it as the detection signal. Although the detection signal of the vibration sensing portion 11 may be represented as an output voltage or an output current, the detection signal of the present embodiment is represented by the output voltage as an example.

The vehicle speed estimation portion 12 is configured to estimate a speed of the vehicle (hereinafter, simply referred to as a vehicle speed) to which the tire 3 provided with the tire side device 1 is attached. The vehicle speed estimation portion 12 is configured to estimate the vehicle speed based on the detection signal of the vibration sensing portion 11. The vehicle speed estimation portion 12 may be a processor or a circuit, for example.

Figure 4:
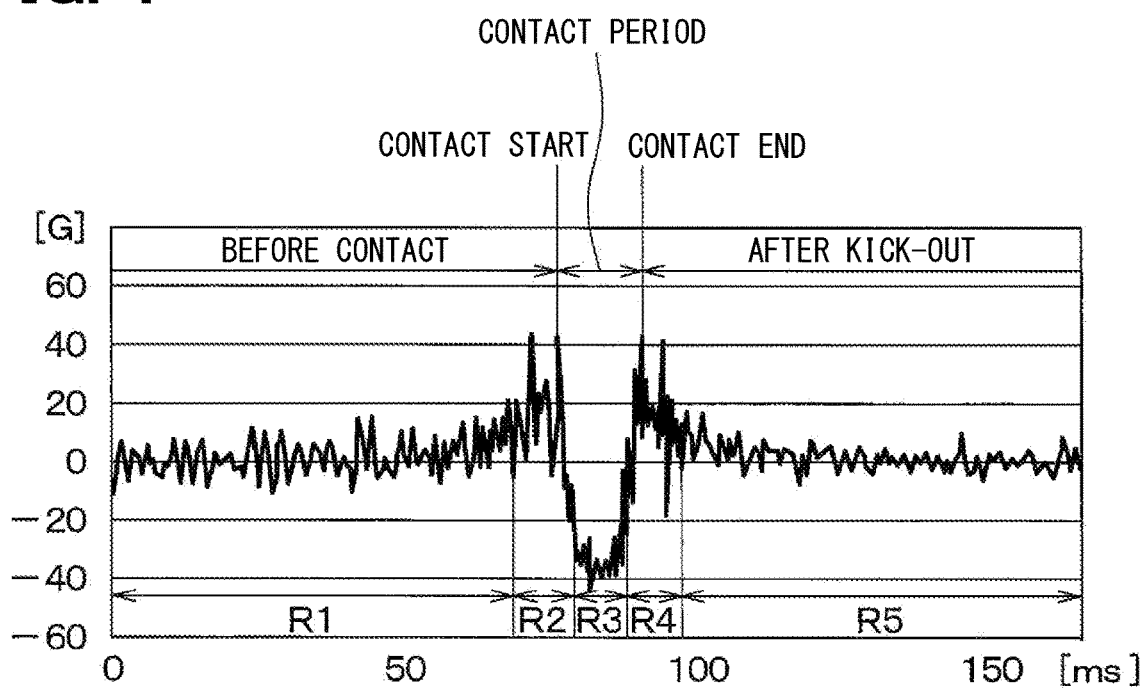
FIG. 4 is a voltage waveform chart output from a vibration sensing portion during rotation of the tire.

For example, the output voltage waveform of the detection signal of the vibration sensing portion 11 output during tire rotation is shown in FIG. 4. As shown in this figure, the output voltage of the vibration sensing portion 11 reaches a maximum value at a start of grounding when a portion of the tread 31 of the tire 3 corresponding to an arrangement position of the vibration sensing portion 11 (hereinafter, referred to as a device arranged position) comes into contact with the ground as the tire 3 rotates. Hereinafter, a peak value at the start of contacting the ground at which the output voltage of the vibration sensing portion 11 has the maximum value is referred to as a first peak value. Further, as shown in FIG. 4, the output voltage of the vibration sensing portion 11 reaches a maximum value again at a contact end time when the portion corresponding to the device arranged position comes out of contact with the ground from the state where the portion is in contact with the ground as the tire 3 rotates. Hereinafter, a peak value at the contact end time when the output voltage of the vibration sensing portion 11 has the maximum value is referred to as a second peak value. As shown in FIG. 4, since the vibration sensing portion 11 is not affected by the centrifugal acceleration while the device arranged position is in contact with the ground, the output voltage of the vibration sensing portion 11 has the minimum value.

The output voltage of the vibration sensing portion 11 has the peak values at the above-described timings for the following reasons. When the device arranged position comes into contact with the ground during the rotation of the tire 3, the part of the tire 3 in the vicinity of the vibration sensing portion 11 having been in approximately cylindrical shape near the vibration sensing portion 11 is pressed and deformed to be a plane shape. Since the vibration sensing portion 11 receives an impact at this time, the output voltage of the vibration sensing portion 11 has the first peak value. When the device arranged location comes out of contact with the ground during the rotation of the tire 3, the part of the tire 3 in the vicinity of the vibration sensing portion 11 is released from the pressurization and restores to the approximately cylindrical shape from the plane shape. Since the vibration sensing portion 11 receives an impact when the shape of the tire 3 returns to the original shape, the output voltage of the vibration sensing portion 11 has the second peak value. As described above, the output voltage of the vibration sensing portion 11 takes the first peak value and the second peak value at the start of contacting ground and at the end of contacting the ground, respectively.

Here, the moment at which the device arranged position of the tire tread 31 comes into contact with the road surface is referred to as a "step-in region", and the moment at which the tire tread 41 leaves the road surface is referred to as a "kick-out region". The "step-in region" includes a timing when the first peak value is reached, and the "kick-out region" includes a timing when the second peak value is reached. In addition, a region before the step-in region is referred to as a "pre-step-in region", a region between the step-in region and the kick-out region, that is, a part in which the device arranged position is in contact with the ground, is referred to as a "pre-kick-out region", and a region after the kick-out region is referred to as a "post-kick-out region". In this way, the period in which the device arranged position is grounded and before and after the period can be divided into five time zones. In FIG. 4, the pre-step-in region, the step-in region, the pre-kick-out region, the kick-out region and the post-kick-out region of the detection signal are indicated as five zones R1 to R5 in sequence, respectively.

When the tire 3 rotates once, the detection signals of the vibration sensing portion 11 shows the vibration waveform shown in FIG. 4. Accordingly, the time interval between the first peak values and between the second peak values is the time required for the tire 3 to make one rotation. Accordingly, the vehicle speed estimation portion 12 is configured to estimate the vehicle speed from the length of the circumference of the tire 3 and the time length required for the tire 3 to make one rotation.

The controller 13 corresponds to a signal processing unit that generates data related to a detection target. The controller 13 is composed of a microcontroller equipped with a CPU, ROM, RAM, I/O, etc. . . . The controller 13 performs various types of processing according to programs stored in the ROM or the like. For example, the controller 13 is configured to obtain data related to the tire wear state (hereinafter, referred to as a wear data) by processing the detection signal of the vibration sensing portion 11 as a detection signal representing vibration data in the tire radial direction, and transmit the data to the data communication unit 14. The data communication unit 14 may be an antenna, for example.

Specifically, the controller 13 is configured to obtain a vibration level of the tire 3 by processing the vibration waveform represented by the detection signal of the vibration sensing portion 11, and transmit the data corresponding to the vibration level as the wear data to the data communication portion 14. Here, the controller 13 calculates a level value of the vibration level in a predetermined frequency range of the detection signal of the vibration sensing portion 11. Although the level value may be a level value of any frequency, the controller 13 of the present embodiment is configured to calculate integral value of the level value in the predetermined frequency range, that is, the integrated level value. Specifically, the controller 13 includes a waveform acquiring portion 13a, a filter portion 13b, and an integral calculation portion 13c as functional units for acquiring the vibration data.

The waveform acquiring portion 13a is configured to acquire the detection signal of the vibration sensing portion 11. Here, the waveform acquiring portion 13a sets one rotation of the tire 3 as an acquiring range and acquires the waveform corresponding to one rotation of the tire 3 from the detection signal of the vibration sensing portion 11. Specifically, the waveform acquiring portion 13a is configured to calculate the time length required for the tire 3 to make one rotation based on the vehicle speed detected by the vehicle speed estimation portion 12, and acquire the detection signal of the vibration sensing portion 11 for the calculated time length.

The filter portion 13b is configured to extract, from the detection signal of the vibration sensing portion 11 for the one rotation of the tire 3 acquired by the waveform acquiring portion 13a, vibration components in the predetermined frequency range by filtering the predetermined frequency range. The filter portion 13b is configured as a high-pass filter, and the frequency range at or above 1.5 kHz is extracted from the detection signal of the vibration sensing portion 11 by passing through the filter portion 13b.

The frequency characteristics of the vibration level in the step-in region and the kick-out region of the tire 3 are determined based on the vibration characteristics of the tire 3 including a rubber block, and the vibration level takes a peak at the natural frequency of the tire 3 including the rubber block. In the frequency range higher than the natural frequency, the vibration level decreases due to the vibration reduction effect of the rubber block. The natural frequency of the tire 3 including the rubber block changes due to the wear state of the rubber block, and the natural frequency increases as the wear of the rubber progresses.

Figure 5:
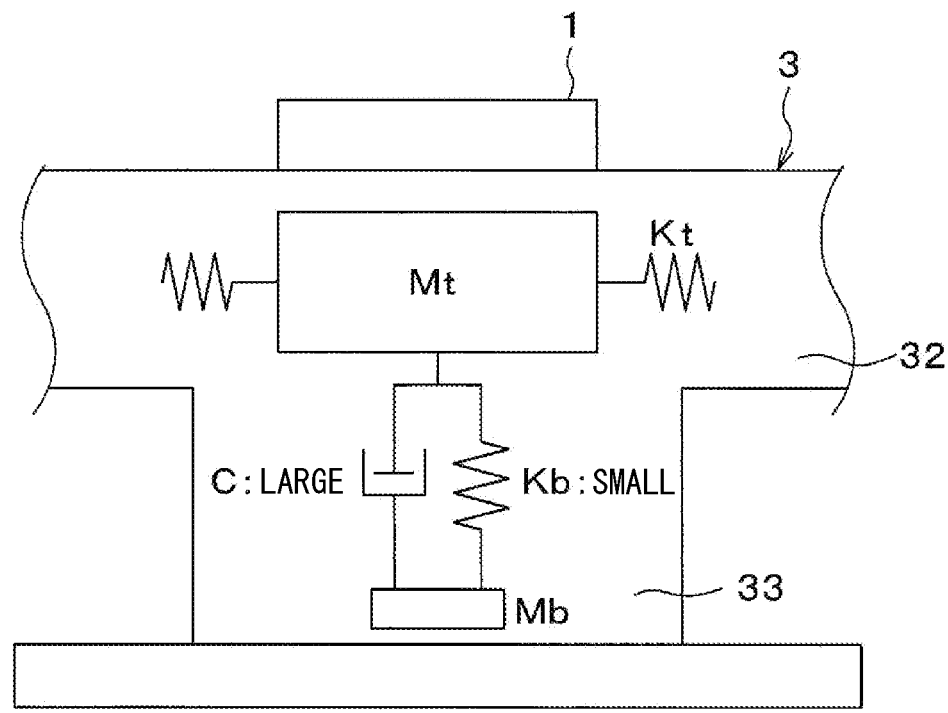
FIG. 5 is a diagram illustrating a vibration model of the tire.

This point will be described with reference to the drawings. FIG. 5 shows a vibration model of the tire 3. The mass of the portion of the tread surface 32 and the rubber block 33 of the tire 3 which may affect the vibration applied to the tire side device 1 is represented by Mt, the spring constant is represented by Kt, and the damping coefficient is represented by C. In the tire 3, the rubber block 33 works as a vibration reducing member against the vibration input from the road surface to function as a low-pass filter.

When the tire 3 is new, the groove of the tire tread 31 is deep, and the height of the rubber block 33 is high. In contrast, when the tire 3 has been worn, the groove of the tire tread 31 becomes shallow, and the height of the rubber block 33 becomes low. Accordingly, the worn tire has smaller mass Mb of the rubber block 33 and large spring constant Kb as compared with new tire 3. Thus, the function of the rubber block 33 as the low-pass filter is reduced, and the high frequency components of the tire vibration is increased.

Figure 6:
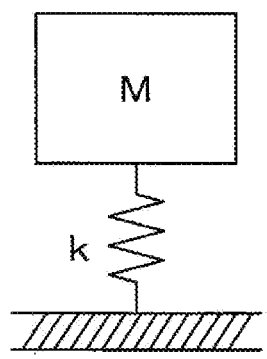
FIG. 6 is a diagram of a general vibration model.
Figure 7:
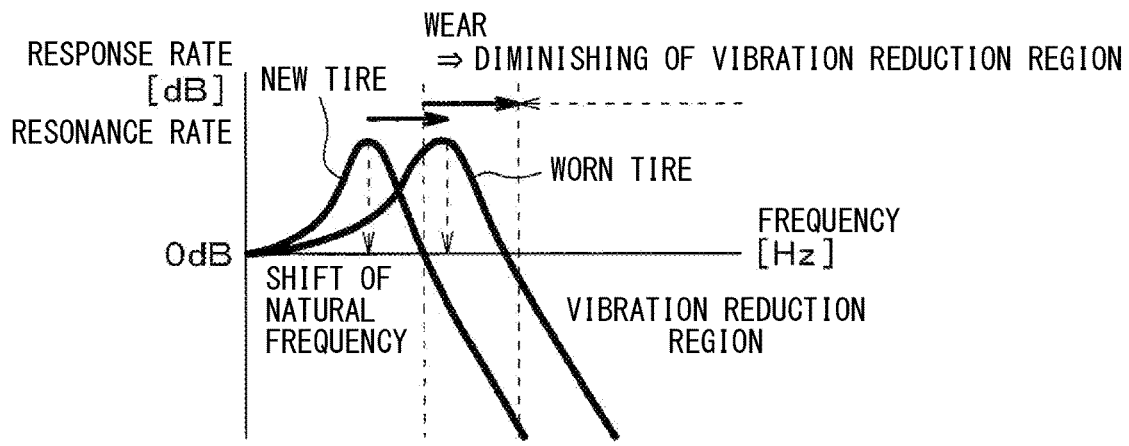
FIG. 7 is a graph showing frequency characteristics of vibration levels of new tire and worn tire.

A general vibration model is shown in FIG. 6, and the natural frequency Fn in this vibration model is expressed by the following expression. In the expression 1, the spring constant of the vibration reducing member in the vibration model is represented by k, and the mass of the vibration source is represented by m.

$$Fn = \frac{1}{2\pi}\sqrt{\frac{k}{m}} \qquad \text{[Expression 1]}$$

The spring constant k is calculated by multiplying the Young's modulus determined by a vibration object constituting the vibration model, i.e. the material of the rubber block 33 in the present embodiment, by the area of the vibration object, and dividing the multiplied value by a thickness of the vibration object, i.e. the height of the vibration object.

In the vibration model of the tire 3 shown in FIG. 5, the mass Mt is sufficiently larger than the mass Mb, and the spring constant Kt is sufficiently larger than the spring constant Kb. Accordingly, the vibration model of FIG. 5 can be regarded as a general vibration model shown in FIG. 6 in consideration of only the mass Mt and the spring constant Kb. That is, the mass m and the spring constant k in the expression 1 can be replaced with the mass Mt and the spring constant Kb of FIG. 5. When the height of the rubber block 33 reduces due to wear, the mass Mb reduces and the spring constant Kb increases accordingly. When the change of the mass Mt is small and the spring constant Kb increases, the natural frequency Fn represented by the expression 1 increases.

As described above, the frequency characteristics of the tire 3 in the step-in region and the kick-out region are determined based on the vibration characteristics of the tire 3 including the rubber block 33, and the vibration level takes a peak at the natural frequency of the tire 3 including the rubber block 33. The natural frequency Fn increases as the rubber block 33 wears and its height decreases. For example, when the tire 3 is new and the depth of the groove is 8 mm, the natural frequency Fn is 1.0 kHz. In contrast, after the tire 3 has worn the depth of the groove is 1.6 mm, the natural frequency Fn is 1.5 kHz. Although the natural frequency Fn varies depending on the material of the tire 3, the natural frequency Fn increases as the tire 3 wears regardless of the material of the tire 3.

Accordingly, a specific depth of the groove is preset as a replacement standard for replacing the tire 3, the natural frequency Fn of the tire 3 whose groove has the depth of the replacement standard is set as a specific frequency, and the frequency range at or above the specific frequency can be extracted by the filter portion 13b as the specific frequency range. For example, when the replacement standard of the tire 3 is 3.0 mm, the filter portion 13b extracts components within the high frequency range at or above 1.5 kHz.

The integral calculation portion 13c corresponds to a level calculation unit configured to calculate the level value of the vibration level within the specific frequency range extracted by the filter portion 13b, and generates the wear data corresponding to the vibration level. Here, the integral calculation portion 13c is configured to calculate the integral value of the level value of the vibration level within the specific frequency range, and the calculated value is used as the wear data. The level value may be calculated from the detection signal for one rotation of the tire 3. The level value may be calculated as the accumulated value of the detection signal for multiple rotations of the tire 3. The level value may be calculated as an average value calculated by dividing the accumulated value by the number of rotations of the tire 3.

As described above, the natural frequency Fn increases as the tire 3 wears. In the same frequency, the vibration level of the detection signal of the vibration sensing portion 11 increases as the tire 3 wears. Accordingly, the level value of the vibration level in the specific frequency range varies depending on the wear state of the tire 3, and the integral value also varies.

Figure 8:
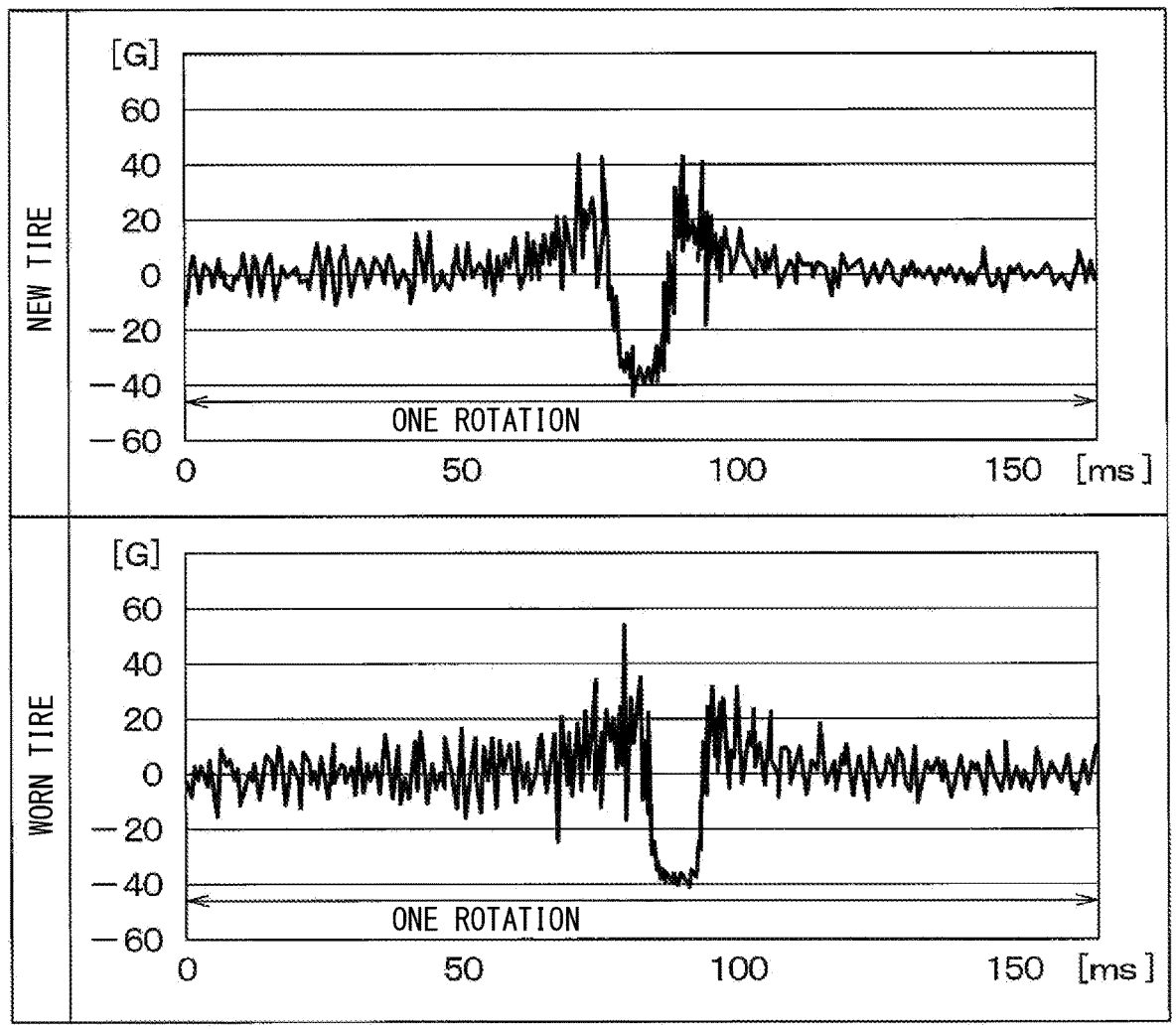
FIG. 8 is a comparative diagram showing voltage waveforms output from the vibration sensing portion during rotation of new tire and worn tire.
Figure 9:
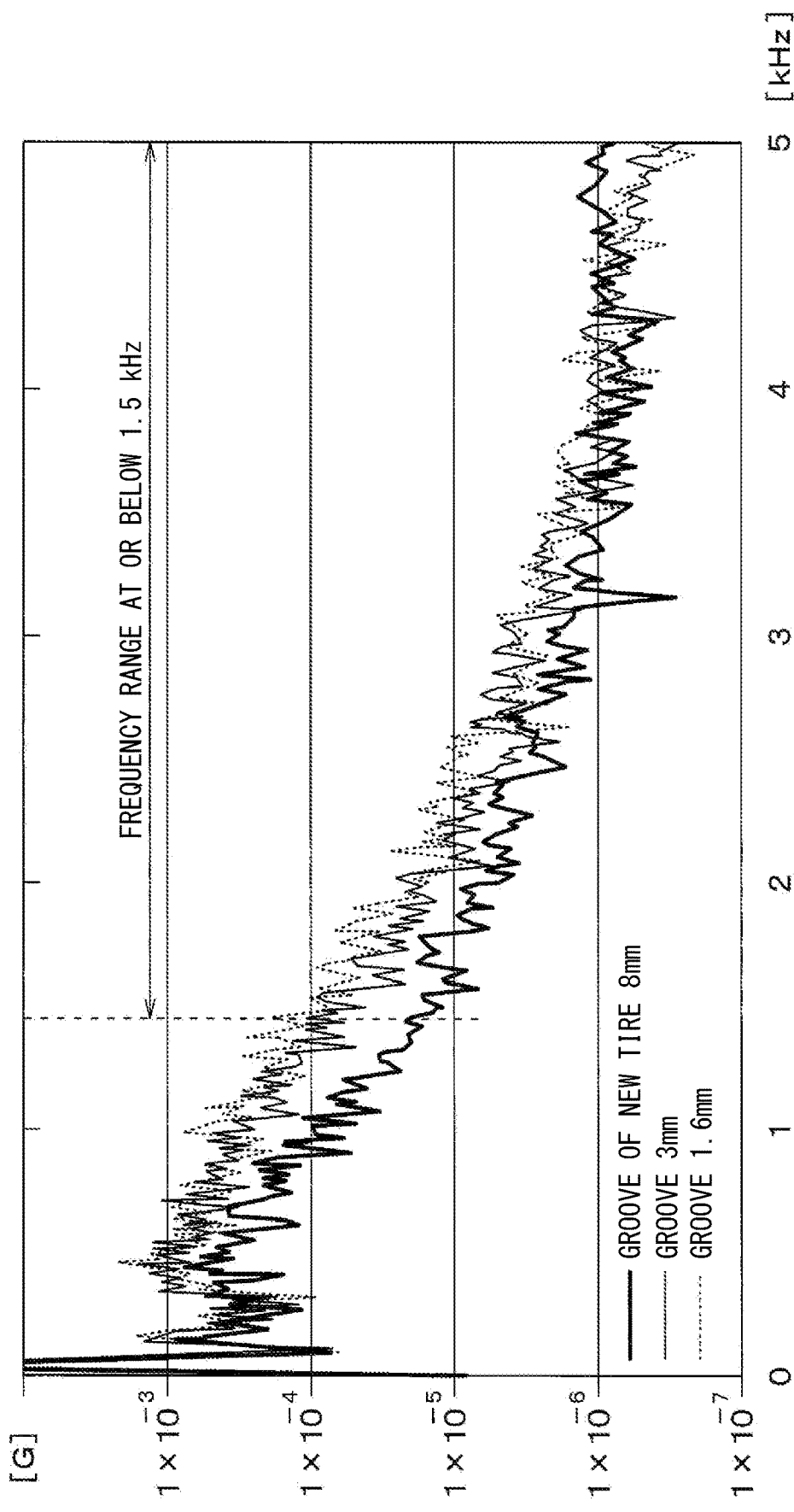
FIG. 9 is a graph showing frequency characteristics of vibration spectrum of the tires having different groove depths.

As a reference, the inventors investigated how the detection signal of the vibration sensing portion 11 and the vibration level vary depending on the wear state of the tire 3. In order to eliminate the influence of vibration due to the unevenness of the road surface, the measurement result is taken when the vehicle travels on a flat road. FIG. 8 shows the detection signal of the vibration sensing portion 11 when the tire 3 is new and has the groove depth of 8 mm, and the detection signal when the tire has worn and has the groove depth of 1.6 mm. FIG. 9 shows vibration spectrum of the tires 3 having the groove depth of 8 mm, 3 mm, or 1.6 mm, i.e. the frequency characteristics of the acceleration spectrum in the present embodiment. FIG. 9 shows the frequency characteristics of the vibration spectrum for one rotation of the tire 3. The vibration spectrum for one rotation of the tire 3 is calculated as an average value of the vibration spectrum for ten rotations of the tire 3.

As shown in FIG. 8, when the tire 3 is new, not worn, and has a sufficiently deep groove, the fluctuation of the detection signal of the vibration sensing portion 11 is small. In contrast, when the tire 3 has worn and has a shallow groove, the fluctuation of the detection signal of the vibration sensing portion 11 is large. As shown in FIG. 9, the vibration spectrum of the detection signal of the vibration sensing portion 11 within the frequency range at or above the natural frequency Fn becomes larger as the tire 3 wears. Accordingly, the wear state of the tire 3 can be detected based on, for example, the level value of the vibration level within the specific frequency range at or above the natural frequency Fn or the accumulated value of the level value of that.

Figure 10:
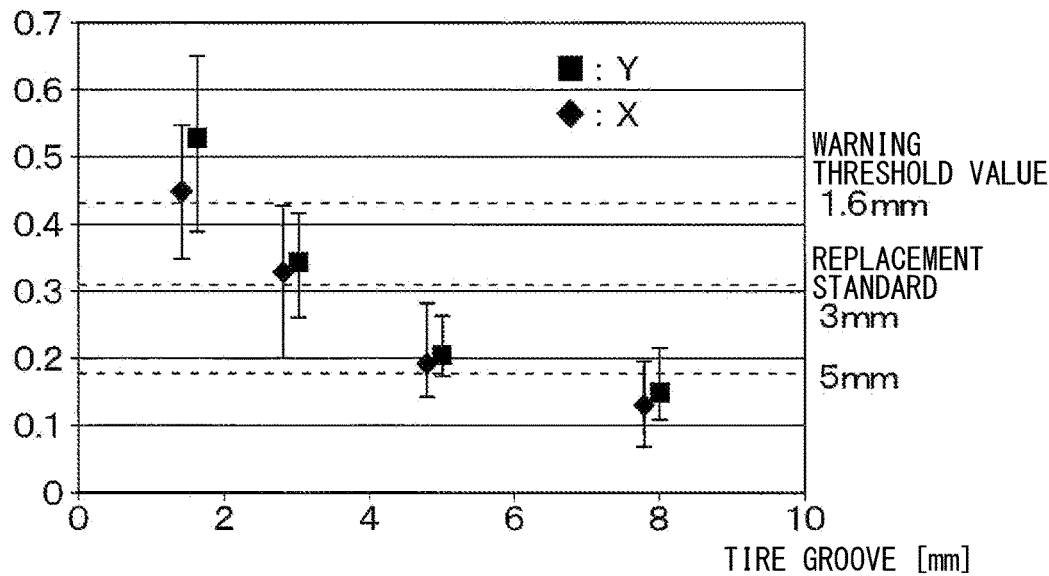
FIG. 10 is a graph showing relationships between accumulated values of the vibration level in the specific frequency range and the groove depths of different tires.

The inventors has investigated whether the relationship between the depth of the groove and the accumulated value of the vibration level within the specific frequency range holds even if the type of the tire 3 is changed. FIG. 10 shows the results of the investigation and the accumulated value of the vibration level of the detection signal of the vibration sensing portion 11 within the frequency range at or above 1.5 Hz. The values for ten rotations of the tire 3 are accumulated, and the maximum value, the minimum value, and the median are plotted for several frequencies.

As shown in this figure, when the type of the tire 3 is either X or Y, the integral value increases as the groove depth becomes shallow, i.e. as the tire 3 wears. Accordingly, the wear state of the tire 3 can be detected based on, for example, the level value of the vibration level within the specific frequency range at or above the natural frequency Fn or the accumulated value of that regardless of the type of the tire 3. When the threshold value is set to 0.3V, the notification device 23 can notify when the groove depth of the tire 3 has reached 3 mm. When a warning threshold value is set to 0.42V in addition to the replacement standard of the tire 3, it can be notified by the notification device 23 that immediate replacement of the tire 3 is required when the groove depth of the tire 3 has reached 1.6 mm.

The controller 13 is configured to control the timing of acquiring the wear data and the transmission of the data from the data communication portion 14. Specifically, the controller 13 is configured to actuate the waveform acquiring portion 13a, the filter portion 13b, and the integral calculation portion 13c at the timing when the detection of the wear state of the tire 3 is required, and transmit the wear data corresponding to the vibration level of the detection signal of the vibration sensing portion 11 to the data communication portion 14. Although it depends on the type of the tire 3, the type of the vehicle, and the way of traveling, the tire 3 generally wears about 1 mm for every 5000 km of traveling. Accordingly, the controller 13 is configured to calculate the traveling distance of the vehicle based on the number of rotation of the tire 3, and detect the wear state of the tire 3 every time the vehicle travels 1 to several hundred kilometers.

The controller 13 may be configured to detect the wear state of the tire 3 at the timing when it is detected that the vehicle starts running based on the detection signal of the vibration sensing portion 11. The controller 13 may has a timer, and may be configured to detect the wear state of the tire 3 at predetermined intervals.

The data communication portion 14 corresponds to a first data communication unit that performs communication with the vehicle body side system 2. The data communication portion 14 is configured to transmit the data upon receiving the wear data from the controller 13, for example. The controller 13 controls the timing of data transmission from the data communication portion 14. For example, the data communication portion 14 is configured to transmit the data upon receiving the wear data from the controller 13 that transfers the wear data when the vehicle travels a predetermined distance.

The tire side device 1 includes a power source portion (not shown) constituted by a button battery or the like, and the units are actuated upon receiving power supplied from the power source portion. The power source portion is configured by a battery such as a button battery, for example.

Subsequently, the vehicle body side system 2 will be described. As described above, the vehicle body side system 2 is provided with the receiver 21, the brake ECU 22, the notification device 23, and the like.

The receiver 21 is configured to receive the wear data transmitted from the tire side device 1 and detect the wear state of the tire 3. Specifically, the receiver 21 includes a data communication portion 21a and a controller 21b.

The data communication portion 21a corresponds to a second data communication unit, and is configured to receive the wear data transmitted from the data communication portion 14 of the tire side device 1 and transmit the wear data to the controller 21b. The data communication portion 21a may be an antenna, for example.

The controller 21b is configured by a microcontroller including a CPU, a ROM, a RAM, an I/O and the like, and performs various processing according to programs stored in the ROM or the like. The controller 21b includes a wear determination portion 21ba, and the wear determination portion 21ba is configured to detect the wear of the tire 3 by performing various processes related on determination of the tire wear state based on the wear data.

In the present embodiment, the integral value of the level value within the predetermined frequency range is used as the wear data, and accordingly the wear determination portion 21ba is configured to determine the wear state based on the integral value. For example, the wear determination portion 21ba is configured to determine the tire wear state by comparing the integral value with a threshold value that is preliminarily obtained by experiments. For example, the threshold value may be the integral value corresponding to the groove depth of the replacement standard of the tire 3. That is, the threshold value is set to be a value that equals to the accumulated value of the tire 3 having the groove depth of the replacement standard calculated by the integral calculation portion 13c based on the detection signal of the vibration sensing portion 11. Accordingly, the wear determination portion 21ba is configured to detect the tire wear state where the groove depth of the tire 3 has reached the replacement standard of the tire 3 when the integral value indicated by the wear data exceeds the threshold value.

Since larger integral value represents that the tire 3 largely has worn, the wear determination portion 21ba may be configured to determine the tire wear state, i.e. the groove depth, of the tire 3 based on the integral value.

Although the wear determination portion 21ba is configured to determine the tire wear state based on the integral value, the wear determination portion 21ba may be configured to determine the tire wear state using the level value of the vibration level of the tire 3 within the specific frequency range or based on the level value of any frequency.

The wear determination portion 21ba is further configured to transmit the detection result to the notification device 23 as required, and the notification device 23 is configured to notify the driver of the tire wear state. Accordingly, this let the driver to drive in consideration of the tire wear state before the tire 3 is replaced, and a risk can be avoided. Further, the worn tire 3 can be replaced appropriately. The tire wear state is transmitted from the wear determination portion 21ba to an ECU such as the brake ECU 22, which performs vehicle motion control, so that the vehicle motion control is performed based on the transmitted tire wear state.

The brake ECU 22 is provided as a braking control device which performs various types of brake control. The brake ECU 22 drives an actuator for brake fluid pressure control to automatically generate a brake fluid pressure and pressurizes a wheel cylinder to generate a braking force. In addition, the brake ECU 22 controls the braking force of each wheel independently.

As described above, the determination result of the tire wear state is transmitted from the wear determination portion 21ba to the brake ECU 22. The brake ECU 22 performs the braking control according to the tire wear state. Specifically, the brake ECU 22 is configured to perform the braking control, as the vehicle motion control, on the assumption that the brakes are less effective as the tire 3 wears. For example, in the braking control during an automatic driving, the brake ECU 22 applies brake earlier as the tire 3 wears. Since the tire 3 is likely to slip as the wear progresses, the tire 3 may slip when large braking force is applied. Accordingly, the brake ECU 22 is configured to generate small braking force earlier compared with a condition where the tire 3 has not worn.

The notification device 23 is composed of, for example, a meter display or the like, and is used to notify the driver of the tire wear state which requires more careful driving. In case that the notification device 23 is configured with the meter display, the notification device 23 is located at a position where the driver easily sees it during driving of the vehicle, for example, within an instrument panel of the vehicle. When the data indicating the tire wear state is transmitted from the receiver 21, the meter display can visually notify the driver of the tire wear state by displaying the data in a manner in which the contents can be grasped. The notification device 23 can also be configured with a buzzer, a voice guidance device, or the like.

The tire system 100 according to the present embodiment is configured as described above. Each unit of the vehicle body side system 2 is connected with each other through an in-vehicle LAN (Local Area Network) like CAN (Controller Area Network) communication. Thus each unit is configured to communicate information mutually through the in-vehicle LAN.

The tire system 100 detects the wear state of the tire 3 based on the level value of the vibration level of the detection signal of the vibration sensing portion 11 as described above. When the tire 3 has worn, the rubber block 33 becomes thin, and the spring constant Kb becomes large. Accordingly, the the level value of the vibration level of the high frequency component of the detection signal of the vibration sensing portion 11 becomes large. The vibration level of the high frequency components of the detection signal of the vibration sensing portion 11 becomes large at any part of the tire 3 when the tire 3 has worn compared with a case where the tire 3 is new.

Accordingly, it may not be necessary to accurately extract the acceleration waveform in the step-in region and the kick-out region, and the vibration waveform for one rotation of the tire 3 may be enough. The tire wear state can be accurately detected based on the level value of the vibration level of the vibration waveform within the specific frequency range for one rotation of the tire 3. Accordingly, it is possible to detect the tire wear state more accurately.

Second Embodiment

A second embodiment will be described below. The present embodiment is an example for detecting the tire wear state more accurately compared with the first embodiment, and the other aspects are the same as those of the first embodiment. Therefore, only the parts different from the first embodiment will be described.

Figure 11:
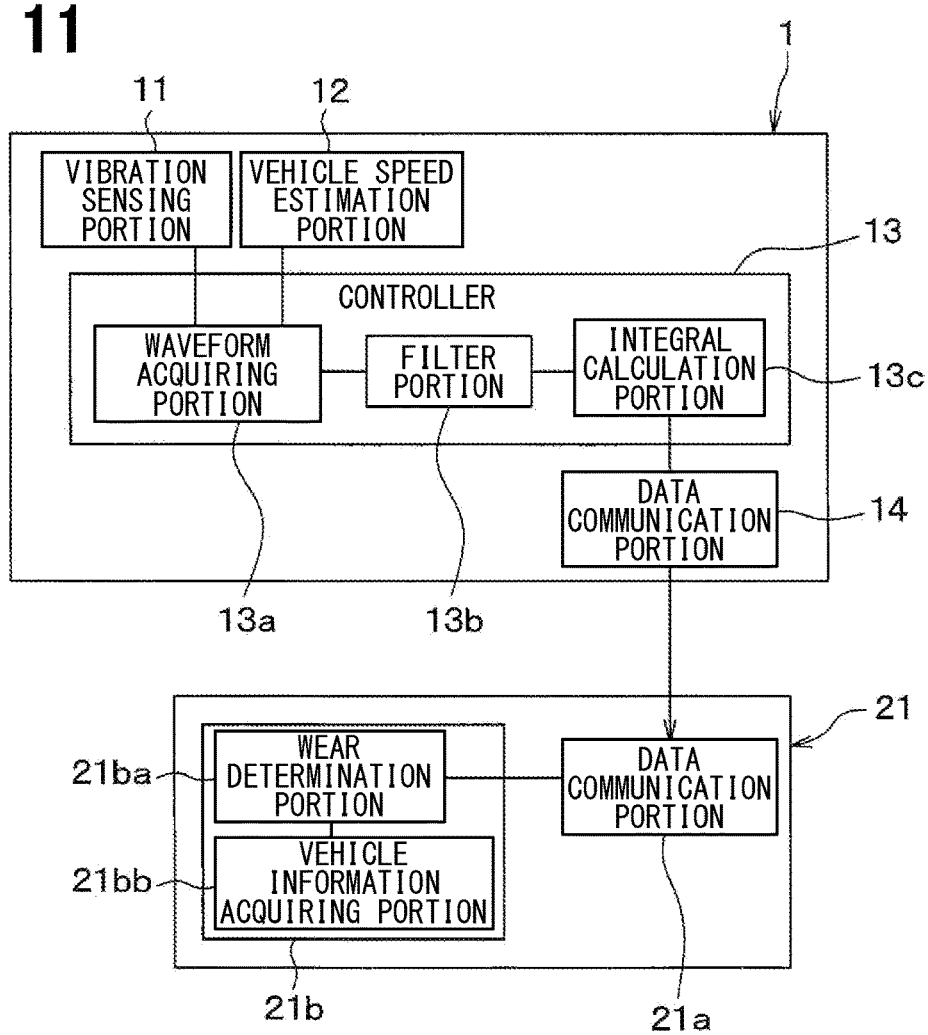
FIG. 11 is a diagram illustrating a block configuration of a tire wear detection apparatus according to at least one embodiment of the present disclosure.

As shown in FIG. 11, in the present embodiment, the controller 21b of the receiver 21 includes a vehicle information acquiring portion 21bb. The vehicle information acquiring portion 21bb is configured to acquire information related to the traveling of the vehicle (hereinafter, referred to as vehicle information). For the detection of the tire wear state, a condition where influences of the traveling state of the vehicle do not appear in the detection signal of the vibration sensing portion 11 may be preferable.

Accordingly, in the present embodiment, the vehicle information acquiring portion 21bb acquires the vehicle information, and selects data effective for detecting the tire wear state from the transmitted wear data by excluding the case where the traveling state may affect the detection signal of the vibration sensing portion 11. Accordingly, the tire wear state can be detected more accurately.

Here, the vehicle information may contain vehicle speed information, acceleration information, steering information, road surface information, tire pressure information, load information, weather information, location information, temperature information and the like. The vehicle information acquiring portion 21bb is configured to acquire one or more of these as the vehicle information.

Since an electronic control unit (hereinafter, referred to as ECU) for meter control handles the vehicle speed information, the vehicle information acquiring portion 21bb can acquire the vehicle speed information from the meter ECU through the in-vehicle LAN or the like. Since an engine ECU handles the acceleration information, the vehicle information acquiring portion 21bb can acquire the acceleration information from the engine ECU through the in-vehicle LAN or the like. The vehicle information acquiring portion 21bb may acquire the acceleration information by calculating the time derivative of the vehicle speed represented by the vehicle speed information. Since a steering ECU handles the steering information, the vehicle information acquiring portion 21bb can acquire the steering information from the steering ECU through the in-vehicle LAN or the like.

The road surface information may be acquired by performing image processing on the image of the road surface taken by an in-vehicle camera or the like. Since the detection signal of the vibration sensing portion 11 also contains information about the road surface condition, the road surface information may be determined based on road surface data extracted from the detection signal of the tire side device 1. General method such as support vector machine can be used for detecting the road surface condition. For example, the condition of the road surface can be estimated by: extracting feature values from the tire vibration from the road surface data; and estimating the condition of the road surface based on similarity between the feature values and training data.

The tire pressure information may be acquired from an ECU of a tire pressure monitoring system (hereinafter, referred to as TPMS-ECU), for example. For example, when the tire side device 1 is further configured to have a function of measuring the tire pressure and transmit the measured tire pressure to the TPMS-ECU, the vehicle information acquiring portion 21bb can acquire the tire pressure information from the TPMS-ECU. Since the length from the first peak value to the second peak value in the vibration waveform of the detection signal of the vibration sensing portion 11 shown in FIG. 4 represents grounding time length during which the tire 3 is in contact with the ground, the load information can be calculated from the tire pressure and the grounding time length. When the load information is handled by a suspension ECU or the like, the vehicle information acquiring portion 21bb can acquire the load information from the suspension ECU.

The weather information, the location information, and the temperature information can be acquired through a navigation ECU or the like.

The vehicle speed information may be used for performing the detection of the tire wear state when the vehicle speed is within a preferable range. The vibration level of the detection signal of the vibration sensing portion 11 is small when the vehicle speed is low, and is large when the vehicle speed is high. Accordingly, it may be preferable that the detection of the tire wear state is performed in the vehicle speed in which the vibration level is neither too small nor too large. Accordingly, the detection of the tire wear state is performed when the vehicle speed is within a predetermined range such as 40 km/h ta based on the vehicle speed information.

The acceleration information is used for determining that the vehicle is not under sudden acceleration or braking. When the vehicle is under sudden acceleration or braking, the detection signal of the vibration sensing portion 11 may be affected. Accordingly, the detection of the tire wear state may be performed when the acceleration is at or below a predetermined value, for example.

The steering information is used for determining that the vehicle is traveling straight. When the vehicle is turning, the detection signal of the vibration sensing portion 11 may be affected. Accordingly, the detection of the tire wear state is performed when the steering angle is at or below a predetermined value, for example. The detection of the tire wear state may be performed when the vehicle is traveling straight.

The road surface information is used for determining that the road surface is flat. For example, the tire 3 may slip when the vehicle is traveling in the rain. Further, when the vehicle is traveling on an uneven road such as gravel roads, the detection signal of the vibration sensing portion 11 may be affected by the vibration due to the unevenness. Accordingly, the detection of the tire wear state is performed when the vehicle is traveling on a dry flat road such as asphalt road.

The tire pressure information is used for determining that the tire pressure is within an appropriate pressure range. When the tire pressure is too high, the tire 3 may be sensitive to vibrate due to unevenness on the road surface. When the tire pressure is too low, the tire 3 may be unlikely to vibrate. Accordingly, the detection signal of the vibration sensing portion 11 may be affected by the tire pressure. Accordingly, the detection of the tire wear state is performed when the tire pressure is within a predetermined appropriate range.

The load information is used for determining that the load is not too high, specifically, that the vehicle is not overloaded. When the vehicle is overloaded, the vibration characteristics may be different from that in the normal condition. Accordingly, the detection of the tire wear state is performed when the load is within a predetermined appropriate range.

The weather information is used for determining that the environment is not unsuitable for detecting the tire wear state, e.g. raining, snowing, or freezing. When it is raining, snowing, or freezing, the tire 3 may slip, and the detection signal of the vibration sensing portion 11 may be affected. Accordingly, the detection of the tire wear state is performed when it is sunny, i.e. when it can be expected that the road surface is dry and the tire 3 is unlikely to slip.

The location information is used for determining that the vehicle is not traveling on a location unsuitable for detecting the tire wear state such as a slope or a road under construction. The location information may be used for determining that the vehicle is traveling on a location suitable for detecting the tire wear state such as an expressway. The detection of tire wear state may preferably be carried out when driving is stable at a constant speed. Accordingly, the detection of the tire wear state is performed when the vehicle is traveling on a flat paved road or an expressway, where the road is not sloped or under construction.

The location information may be used in combination with the weather information. That is, since the weather information is issued for each region, when the location of the vehicle is identified from the location information and the weather of the region where the vehicle is traveling is obtained from the weather information, the detection of the tire wear state can be performed based on accurate weather information.

The temperature information is used for determining that the temperature is not unsuitable for detecting the tire wear state. Since the tire 3 made of rubber becomes soft at a high temperature, the spring characteristics may change, which may result in a condition unsuitable for detecting the tire wear state. Accordingly, the detection of the tire wear state is not performed when the outside air temperature is at or above a predetermined temperature.

As described above, the vehicle information acquiring portion 21bb acquires the vehicle information such that the detection of the tire wear state is performed when the situation is suitable. That is, when the wear data is transmitted from the tire side device 1, effective data for the detection of the tire wear state can be selected from the transmitted wear data based on the vehicle information acquired by the vehicle information acquiring portion 21bb. For example, particularly effective data for detecting the tire wear state, such as the wear data when the vehicle is traveling straight at a constant speed within the predetermined range, can be selected. Accordingly, it is possible to detect the tire wear state more accurately.

When the tire wear state is detected when the vehicle speed is within a predetermined range, the tire side device 1 may be configured to transmit the wear data only when the condition is satisfied so as to detect the tire wear state accurately. For example, since the tire side device 1 is configured to calculate the vehicle speed by the vehicle speed estimation portion 12, the waveform acquiring portion 13a may be configured to acquire the detection signal of the vibration sensing portion 11 only when the calculated vehicle speed is within the predetermined range. According to this configuration, since the wear data is transmitted only when the situation is suitable for detecting the tire wear state, the tire wear state can be detected accurately, and the frequency of the transmission can be reduced. As a result, the power consumption can be reduced.

Third Embodiment

A third embodiment will be described below. The present embodiment is a modification of the first and second embodiments. In the present embodiment, an initial state of the tire wear state can be set, and the other aspects are the same as those of the first embodiment. Therefore, only the parts different from the first and second embodiments will be described. Although the case where the present embodiment is applied to the first embodiment will be described here, it can also be applied to the second embodiment.

Figure 12:
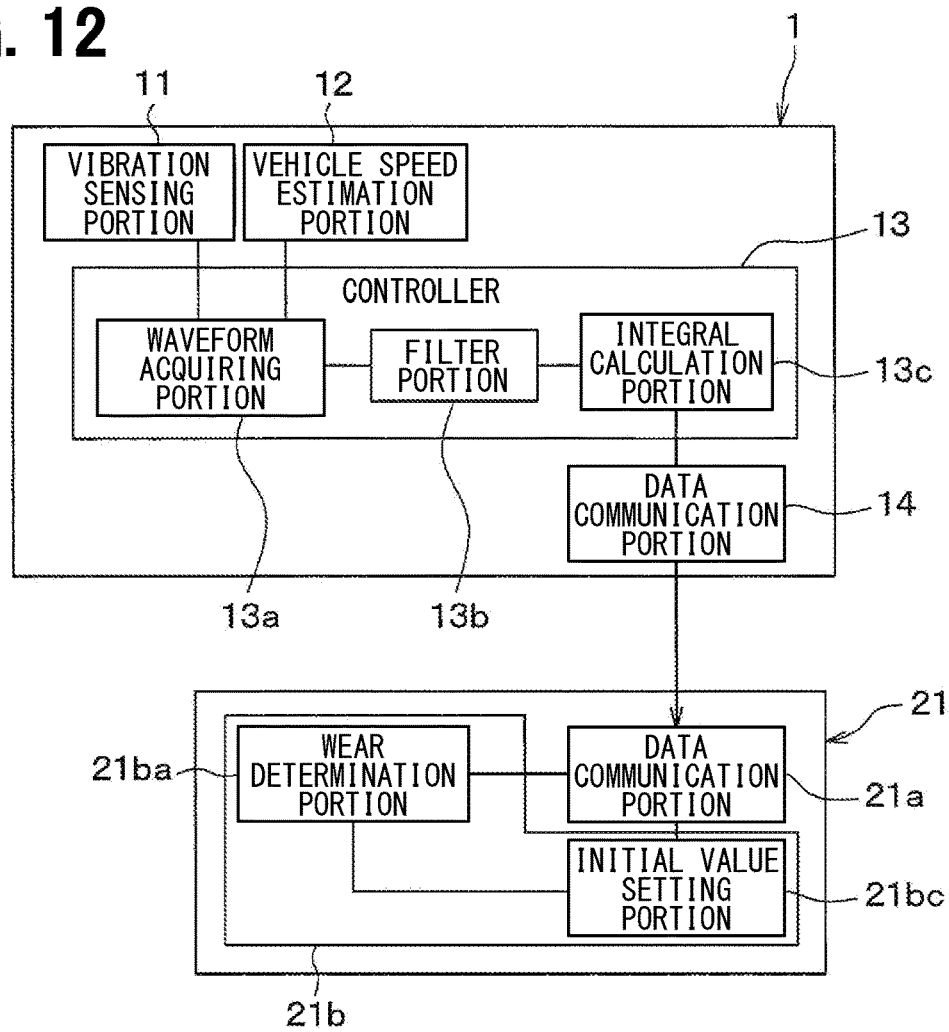
FIG. 12 is a diagram illustrating a block configuration of a tire wear detection apparatus according to at least one embodiment of the present disclosure.

As shown in FIG. 12, in the present embodiment, the controller 21b includes an initial value setting portion 21bc. The initial value setting portion 21bc is configured to set an initial value of the tire wear state.

Although described in the first embodiment, it may be difficult to set the threshold value and the warning threshold value which can be applied to a wide variety of tires because the integral values for each groove depth of tire 3 vary depending on the type of tire 3. In view of this point, the level value of the vibration level, or the integral value here, that corresponds to the tire wear state of new tire 3 before having worn is set as the initial value, and the integral value is normalized based on the initial value.

Figure 13:
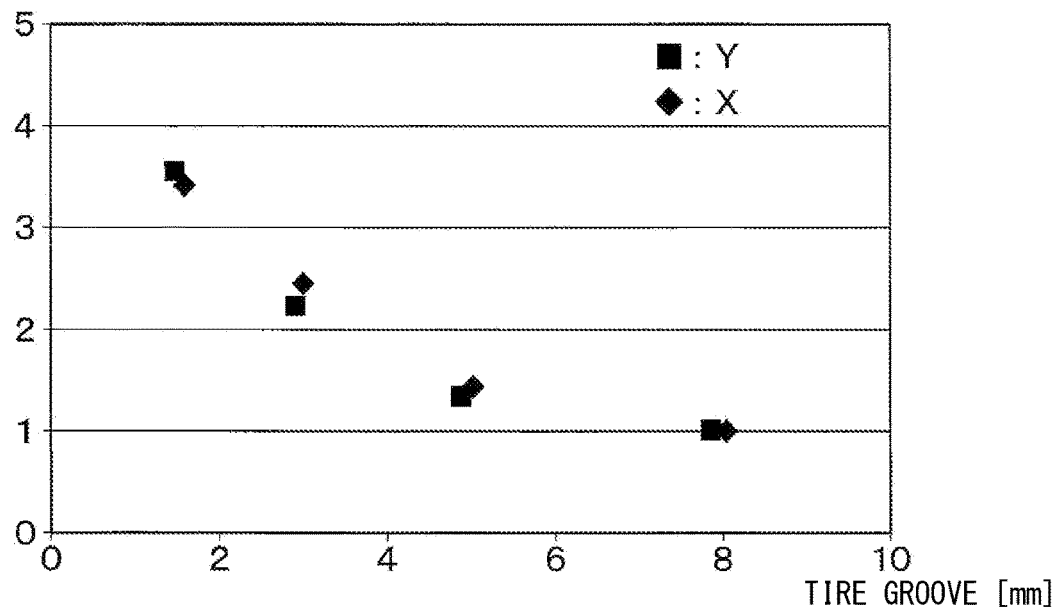
FIG. 13 is a graph showing relationships between groove depths and accumulated values of a vibration level in the specific frequency range which is normalized by using the accumulated value of new tire as an initial value.

FIG. 13 shows normalized integral values obtained by normalizing the integral values based on the integral value of new tire 3 having the groove depth of 8 mm. Specifically, the integral value of new tire 3 is set to one, and the normalized integral value is calculated such that the value becomes larger as a change amount of the integral value is large. As shown in FIG. 13, the normalized integral values for each groove depth of the tire 3 are almost the same regardless of the type of the tire 3.

Accordingly, the initial value setting portion 21bc is configured to set, as the initial value, the integral value obtained when the tire 3 is new, and the wear determination portion 21ba is configured to calculate the normalized integral value that is a relative change of the integral value obtained during the detection of the tire wear state relative to the initial value. According to this, the tire wear state can be accurately detected regardless of the type of the tire 3 by comparing the normalized integral value with the threshold value or the warning threshold value.

Fourth Embodiment

A fourth embodiment will be described. The present embodiment is a modification of the first to third embodiments. In the present embodiment, a correction based on degradation of the tire 3 is performed. The other aspects are the same as those in the first to third embodiments, and hence only the parts different from the first to the third embodiments will be described.

In the above first to third embodiments, the tire wear state is detected based on the fact that the rubber block 33 becomes thinner due to wear of the tire 3 and the vibration level of the high frequency component of the detection signal of the vibration sensing portion 11 changes as the spring constant Kb changes. However, since the tire 3 is made of rubber, the spring constant Kb of the rubber block 33 changes due to degradation, and accordingly it may be difficult to detect the tire wear state accurately.

Figure 14A:
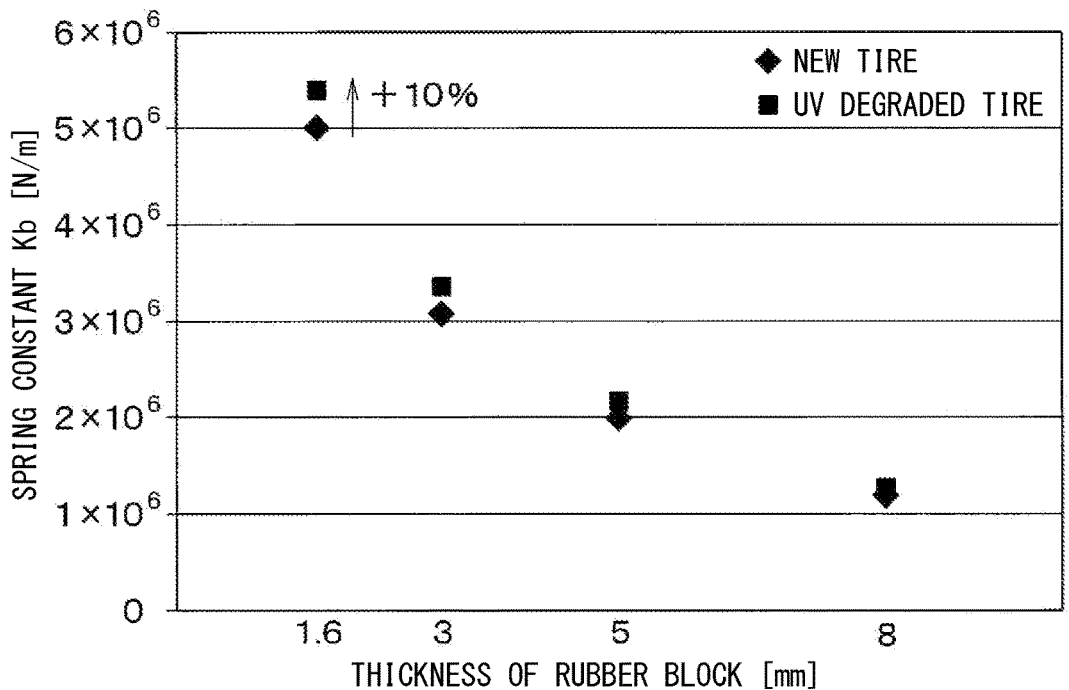
FIG. 14A is a graph showing changes of a spring constant Kb of new tire and UV degraded tire that has been exposed to UV light for three years.
Figure 14B:
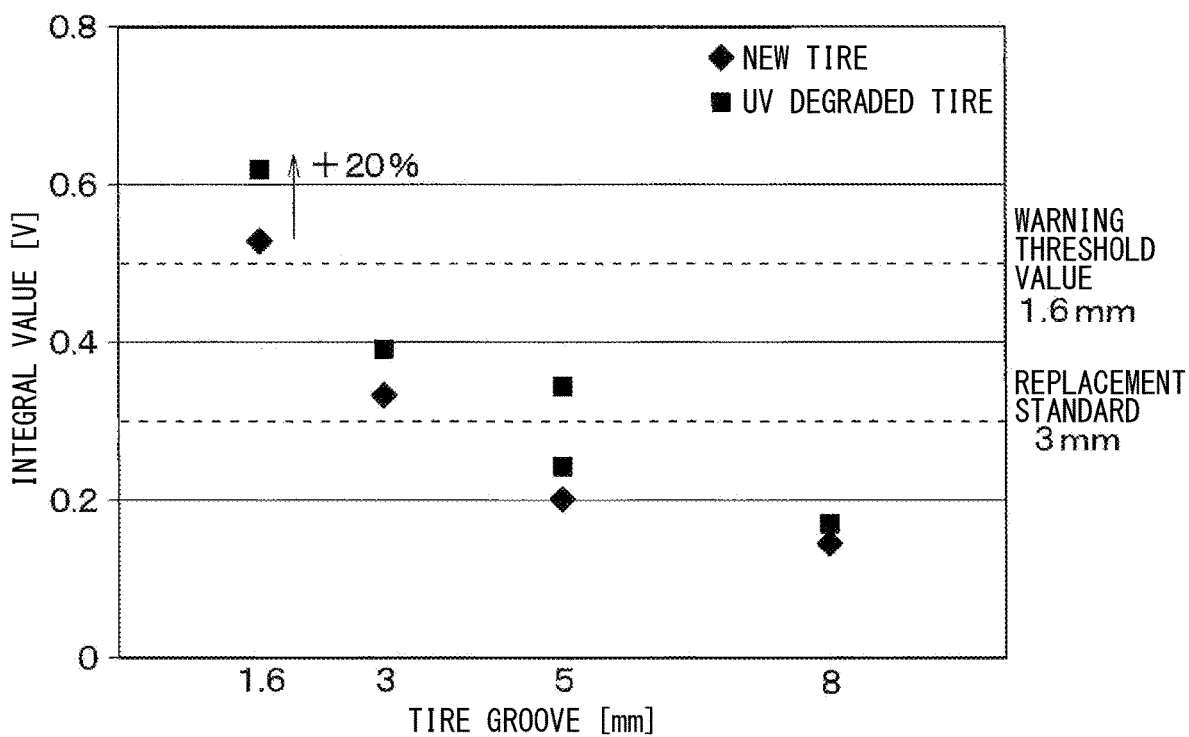
FIG. 14B is a graph showing changes of accumulated values of new tire and UV degraded tire that has been exposed to UV light for three years.

The inventors have investigated about changes of the spring constant Kb and the integral values for each of new tire 3 or UV degraded tire that has been exposed to ultraviolet rays corresponding to three years driving. In the investigation, a load is applied with a load cell to the cut out rubber block 33, and the deformation of the rubber block 33 is measured using a laser displacement meter. FIGS. 14A and 14B show the results. As shown in FIG. 14A, the spring constant Kb of the UV degraded tire increased by 10%. Since the spring constant Kb increases due to the degradation caused by light irradiation or the like, the vibration level of the detection signal of the vibration sensing portion 11 may increase. As shown in FIG. 14B, the integral value of the degraded tire is 20% higher than that of new tire, and this means that the groove depth of the degraded tire is erroneously detected by about 1 mm. Accordingly, the correction corresponding to the degradation is performed in the present embodiment. The tire wear detection apparatus of the present embodiment will be described with reference to FIG. 15.

Figure 15:
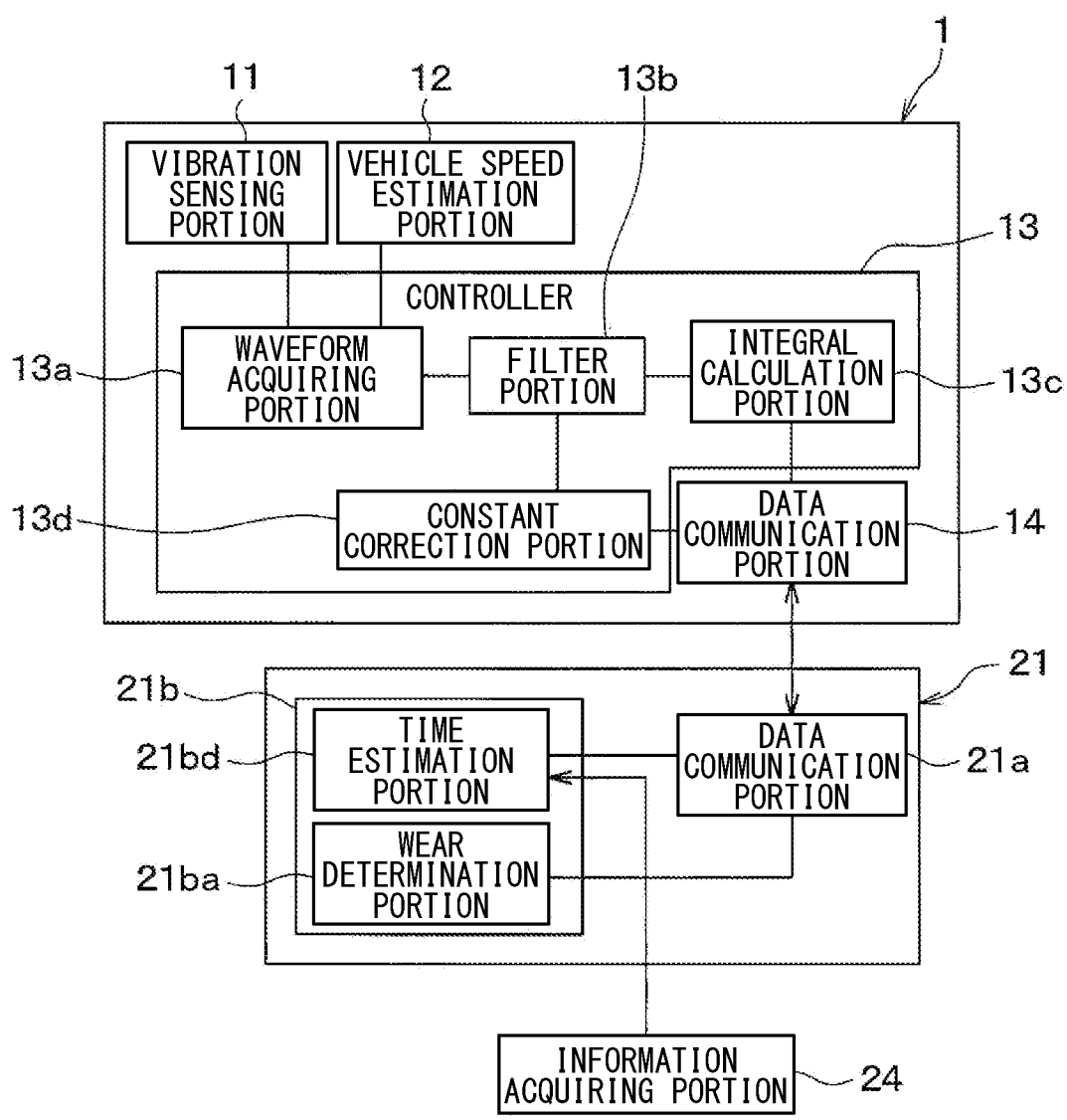
FIG. 15 is a diagram illustrating a block configuration of a tire wear detection apparatus according to at least one embodiment of the present disclosure.

As shown in FIG. 15, in the tire wear detection apparatus of the present embodiment, the controller 21b of the receiver 21 in the vehicle body side system 2 includes a time estimation portion 21bd, and information is input from an information acquiring portion 24 to the time estimation portion 21bd. The controller 13 of the tire side device 1 includes a constant correction portion 13d. The data communication portion 14 of the tire side device 1 and the data communication portion 21a of the vehicle body side system 2 are configured to communicate with each other.

The time estimation portion 21bd is configured to estimate an accumulated time of solar irradiation based on the information from the information acquiring portion 24. The information acquiring portion 24 is configured to acquire information used for estimating the accumulated time of solar irradiation. The information contains at least one of detection signal information of a solar irradiance sensor, image information of a camera, map information, weather information, time information, vehicle orientation information, or tire position information. For example, when the accumulated time of solar irradiation is estimated using the detection signal information of the solar irradiance sensor, the solar irradiance sensor corresponds to the information acquiring portion 24. When the accumulated time of solar irradiation is estimated using the image information of the camera, the camera corresponds to the information acquiring portion 24. When the accumulated time of solar irradiation is estimated using the map information, the weather information, the time information, or the vehicle orientation information, a navigation system or the like corresponds to the information acquiring portion 24.

Since the detection signal information of the solar irradiance sensor represents a state of solar irradiation, the accumulated time of solar irradiation can be estimated by the time estimation portion 21bd based on the detection signal information of the solar irradiance sensor. Since the image information of the camera contains information of weather, the accumulated time of solar irradiation can be estimated from the accumulated time of sunny time based on the image information by the time estimation portion 21bd. The map information, for example, can be information about whether a parking lot is indoors or outdoors, or information about the weather in the location where the vehicle is parked or driving, along with weather and time information. Accordingly, the accumulated time of solar irradiation can be estimated by the time estimation portion 21bd based on the map information, the weather information, and the time information. The vehicle orientation information and the tire position information can be information about a position of the tire. For example, even in fine weather, the amount of light irradiating the tire may vary depending on the tire position. Accordingly, the time estimation portion 21bd is configured to use the accumulated time of solar irradiation in fine weather as the accumulated time for the tire 3 facing south, and estimate the accumulated time of solar irradiation for the tire 3 facing north by correcting to reduce the accumulated time of solar irradiation in fine weather. Thus, the time estimation portion 21bd is configured to estimate the accumulated time of solar irradiation for each tire 3.

After the time estimation portion 21bd estimated the accumulated time of solar irradiation, information about the estimated result is transmitted to the tire side device 1 through the data communication portion 21a. The information about the estimated result is received by the tire side device 1 through the data communication portion 14.

The constant correction portion 13d is configured to calculate a corrected value of a filter constant of the filter portion 13b based on the information about the estimated result of the accumulated time of solar irradiation transmitted from the vehicle body side system 2. When the tire 3 is degraded, the change of the spring constant of the rubber block 33 dominantly affects the vibration spectrum obtained from the detection signal of the vibration sensing portion 11, and the amount of shift of the vibration spectrum can be estimated by ½ power of the spring constant Kb. Accordingly, the change rate of the spring constant with respect to the accumulated time of solar irradiation is investigated in advance by experiment or the like, and a function or a map of the relationships is stored in the constant correction portion 13d. Therefore, the constant correction portion 13d can determine the corrected value corresponding to the accumulated time of solar irradiation using the function or the map. Specifically, the correction is performed such that a cutoff frequency becomes higher as the accumulated time of solar irradiation becomes longer.

For example, when the function is used, the cutoff frequency of the change rate of the spring constant corresponding to the accumulated time of solar irradiation is raised by ½ power to correct the filter constant. Specifically, in the vibration model of FIG. 6, the natural frequency Fn is represented by the above-described expression 1. When the spring constant k increases due to the degradation of the tire 3, the natural frequency Fn changes by a square root of the change of the spring constant k. When the filter constant of the filter portion 13b is 1.5 kHz and the spring constant k changes to be 1.1 times of that of new tire due to the degradation, the natural frequency Fn is multiplied by 1.5× $1.1^{1/2}$ and the multiplied value is set as the filter constant.

The tire wear detection apparatus is configured as described above in the present embodiment. In the tire wear detection apparatus of the present embodiment, the filter constant of the filter portion 13b is corrected based on the accumulated time of solar irradiation. Accordingly, the filter constant can be corrected even when the spring constant Kb of the rubber block 33 changes due to the degradation of the tire 3. Thus, erroneous detection of the groove depth of the tire 3 can be suppressed, and the tire wear state can be accurately detected.

Fifth Embodiment

A fifth embodiment will be described. The present embodiment is a modification of the first to third embodiments. In the present embodiment, similarly to the fourth embodiment, a correction is performed based on the degradation of the tire 3. In the present embodiment, the integral value of the integral calculation portion 13c is corrected instead of the filter constant. Since the others are the same as those in the fourth embodiment, only the parts different from the fourth embodiment will be described.

Figure 16:
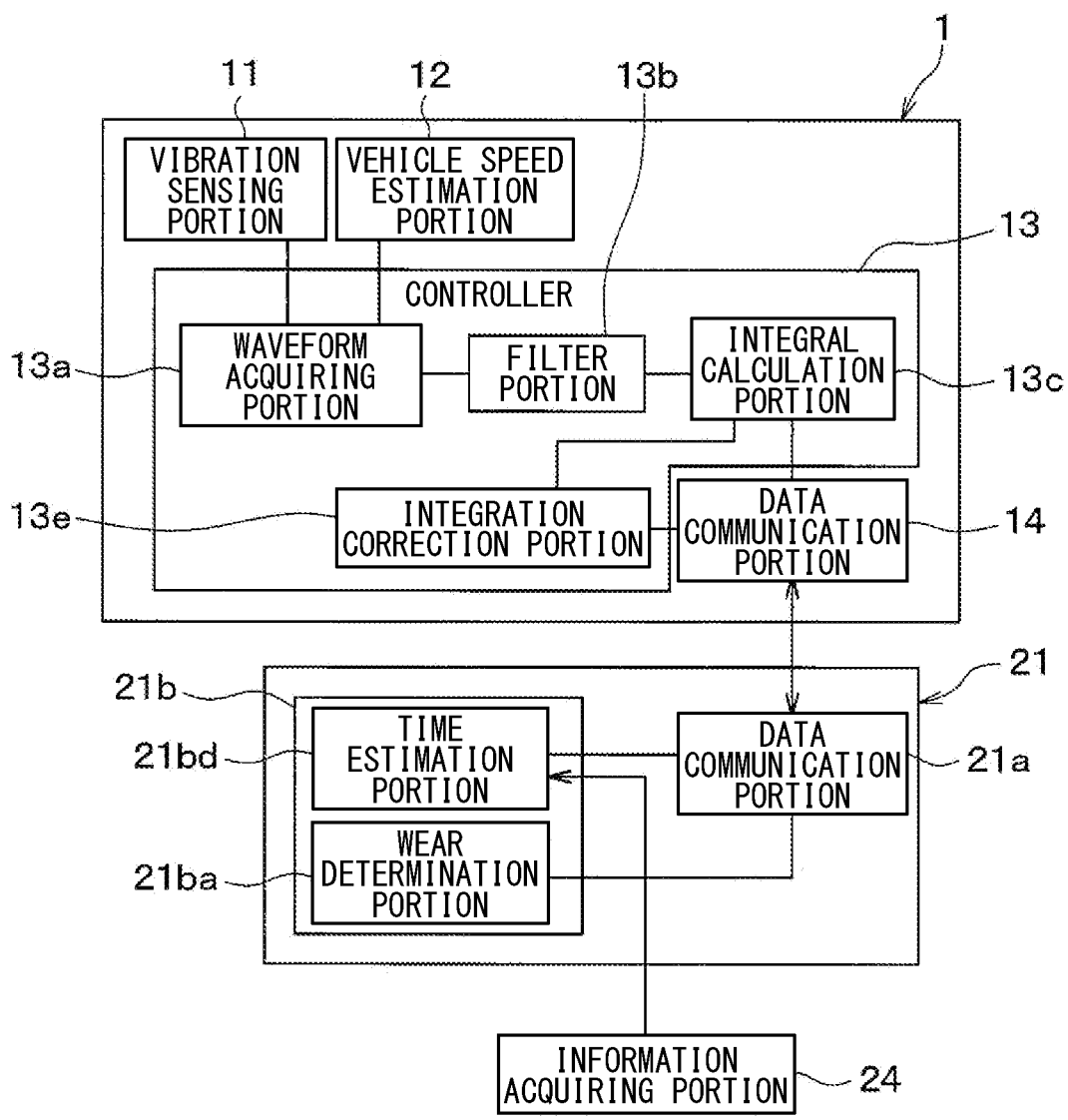
FIG. 16 is a diagram illustrating a block configuration of a tire wear detection apparatus according to at least one embodiment of the present disclosure.

As shown in FIG. 16, in the present embodiment, an integration correction portion 13e for correcting the integral value is provided. The integration correction portion 13e is configured to calculate the corrected value of the calculation by the integral calculation portion 13c based on the accumulated time of solar irradiation estimated by the accumulated time of solar irradiation 21bd which is transmitted from the vehicle body side system 2.

As described above, when the spring constant Kb increases due to the degradation of the tire 3, the vibration level of the detection signal of the vibration sensing portion 11 may increase. Accordingly, when the filter constant is not corrected as in the fourth embodiment, components passing through the filter portion 13b increases, and the integral value of the integral calculation portion 13c may be erroneously large. In consideration of this point, the integral value of the integral calculation portion 13c is corrected such that the integral value becomes smaller as the accumulated time of solar irradiation becomes longer. For example, the integral value is corrected by multiplying a correction coefficient smaller than one.

How much the components passing through the filter portion 13b increases when the tire 3 degrades is not uniquely determined. Accordingly, the difference between the integral value of new tire and the degraded tire is investigated under the same traveling condition, and the corrected constant is determined based on the experimental results.

As described above, the integral value of the integral calculation portion 13c is corrected based on the accumulated time of solar irradiation. Even in this way, erroneous detection of the groove depth of the tire 3 can be suppressed, and the tire wear state can be detected accurately.

Sixth Embodiment

A sixth embodiment will be described. The present embodiment is a modification of the first to fifth embodiments. In the present embodiment, a part which is provided in the tire side device 1 in the other embodiments is provided in the receiver 21 of the vehicle body side system 2. Since the other aspects are the same as those in the first to fifth embodiments, only the parts different from the first to fifth embodiments will be described.

Figure 17:
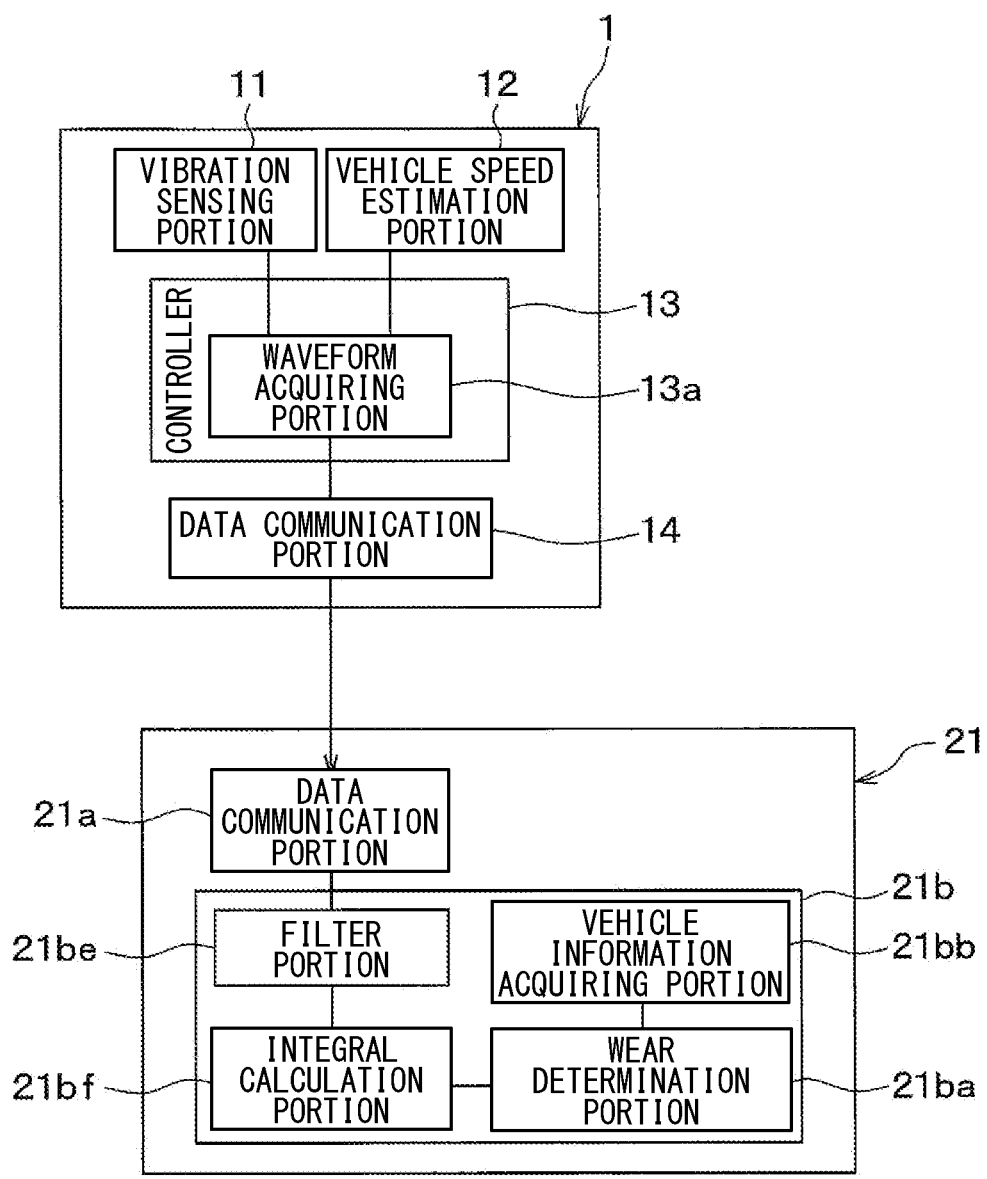
FIG. 17 is a diagram illustrating a block configuration of a tire wear detection apparatus according to at least one embodiment of the present disclosure.

As shown in FIG. 17, in the present embodiment, the controller 13 of the tire side device 1 includes the waveform acquiring portion 13a, but does not include the filter portion 13b and the integral calculation portion 13c. In contrast, the controller 21b of the receiver 21 includes the filter portion 21be and the integral calculation portion 23bf in addition to the wear determination portion 21ba. The filter portion 21be and the integral calculation portion 23bf have the same functions as the filter portion 13b and the integral calculation portion 13c described in the first embodiment.

In this configuration, raw data of the detection signal of the vibration sensing portion 11 acquired by the waveform acquiring portion 13a is transmitted from the tire side device 1 to the vehicle body side system 2 through the data communication portion 14. In the vehicle body side system 2, the receiver 21 receives the raw data transmitted from the tire side device 1 through the data communication portion 21a, and the vibration level within the specific frequency range is extracted by filtering it by the filter portion 21be. The integral calculation portion 23bf is configured to calculate the integral value of the level value of the extracted vibration level.

As described above, the vehicle body side system 2 may include the filter portion 21be and the integral calculation portion 23bf instead of the tire side device 1. Even with the above configuration, the same effects as those of the above embodiments can be achieved. Here, the present embodiment is described as a modification of the second embodiment. However, the the receiver 21 of the present embodiment may not include the vehicle information acquiring portion 21bb as in the first embodiment. Moreover, the receiver 21 may include the initial value setting portion 21bc, time estimation portion 21bd, and the information acquiring portion 24 as in the third to fifth embodiments.

OTHER EMBODIMENTS

Although the present disclosure is made with reference to the embodiments described above, the present disclosure is not limited to such embodiments but may include various changes and modifications which are within equivalent ranges. In addition, while the various combinations and configurations, which are preferred, other combinations and configurations, including more, less or only a single element, are also within the spirit and scope of the present disclosure.

(1) For example, in the above-described embodiments, the vibration sensing portion 11 is configured to output the detection signal according to the magnitude of the vibration in the radial direction of the tire 3, this is because the change of the vibration due to the wear state of the tire 3 appears significantly in the radial direction. However, since the vibration in a normal direction and a width direction of tire 3 also changes due to the wear state of the tire 3, the vibration sensing portion 11 may be configured to output the detection signal according to the magnitude of the vibration in the normal direction or the width direction of the tire 3, and the tire wear state may be detected based on such detection signal.

(2) In the above-described embodiments, the detection of the wear state of the tire 3 is performed each time when the vehicle travels 1 to several hundred kilometers. This is just an example, and the detection of the wear state of the tire 3 may be performed every time when the vehicle travels shorter distance or longer distance. In the detection of the wear state of the tire 3, the tire side device 1 may be configured to transmit wear data several times instead of once.

Specifically, in the second embodiment, when the wear data transmitted from the tire side device 1 is not selected as the effective data, the wear data is not used for the detection of the wear state of the tire 3. Accordingly, it may be preferable that the wear data is transmitted from the tire 1 several times and the detection of the wear state of the tire 3 is performed based on any one of wear data. Moreover, even when the wear data is transmitted several times, effective data may not be selected if the traveling state of the vehicle has not changed. Accordingly, the acquisition and the transmission of the wear data may be preferably performed every time the vehicle travels several hundred meters to several hundred kilometers in which it is expected that the traveling state of the vehicle changes.

(3) In the above-described embodiments, the detection result of the wear state of the tire 3 is notified by the notification device 23, and the detection result is used for the vehicle control by transmitting it to the brake ECU. However, these configurations are just examples. For example, the vehicle body side system 2 may include a vehicle communication device configured to communicate with a communication medium outside the vehicle, and the detection result may be transmitted to a portable device such as a mobile phone or a communication center through the vehicle communication device. When the detection result is transmitted to the portable device, the user can be advised to replace the tire 3 through the portable device. When the detection result is transmitted to the communication center, the communication center can notify a vehicle maintenance shop such as a dealer of the wear state of the tire 3. Accordingly, the user can be advised by the vehicle maintenance shop to replace the tire 3.

(4) In the above-described embodiments, the vehicle speed estimation portion 12 is configured to estimate the vehicle speed based on the detection signal of the vibration sensing portion 11. However, this is just an example. The tire side device 1 and the receiver 21 may be configured to communication with each other, and the vehicle speed estimation portion 12 may be configured to estimate the vehicle speed by acquiring the data about the vehicle speed from the receiver 21 through the data communication portion 14. In this case, since the vehicle speed indicated by the data transmitted from the receiver 21 can be estimated as the vehicle speed at that time, the vehicle speed estimation portion 12 is configured to forward the data about the vehicle speed to the waveform acquiring portion 13*a*, and the waveform acquiring portion 13*a* sets the acquiring range using the data. The receiver 21 may use, as the data about the vehicle speed, the vehicle speed information acquired by the vehicle information acquiring portion 21*bb*.

When the tire side device 1 and the receiver 21 are configured to perform a mutual communication, various forms of bidirectional communication can be used. Bluetooth communication including BLE (Bluetooth Low Energy) communication, wireless LAN (Local Area Network) such as wifi, Sub-GHz communication, ultra wideband Communication, ZigBee, etc. can be used for the bidirectional communication. "Bluetooth" is a registered trademark.

When the tire side device 1 and the receiver 21 are configured to perform bidirectional communication, the selection of the wear data in the second embodiment may be a selection of a timing for creation of the wear data. That is, the receiver 21 may be configured to determine that the traveling condition is suitable for the detection of the wear state of the tire 3 based on the vehicle information acquired by the vehicle information acquiring portion 21*bb*, and the receiver 21 may be configured to request the wear data to the tire side device 1. The tire side device 1 is configured to transmit the wear data upon receiving the request signal. According to this configuration, since the wear data is transmitted to the receiver 21 when the traveling condition is suitable for the detection of the wear state of the tire 3, the wear state of the tire 3 can be detected accurately based on the wear data.

(5) In the above embodiments, the tire side device 1 is provided for each of several tires 3, but it is sufficient that the tire side device 1 is provided in at least one of the tires 3. That is, since the tire wear state of several tires 3 are the same, the wear state of all tires 3 can be estimated when the tire wear state of one tire 3 is detected based on the wear data generated by the tire side device 1 provided in one tire 3.

(6) In the fifth embodiment, the integral value of the integral calculation portion 13*c* is corrected. However, the threshold value used in the wear determination portion 21*ba* for the determination of wear may be corrected. For example, in consideration of degradation of the tire 3, the threshold value may be corrected to be large as the accumulated time of solar irradiation becomes longer. In this case, the correction can be performed by the vehicle body side system 2, and it is not necessary to transmit the accumulated time of solar irradiation by the bidirectional communication.

(7) In the above-described embodiments, the wear determination portion 21*ba* is provided in the receiver 21. However, the controller 13 of the tire side device 1 may also include the wear determination portion, and the tire side device 1 may be configured to transmit the determination result of the wear determination portion to the receiver 21.

What is claimed is:

1. A tire wear detection apparatus configured to detect a tire wear state, the tire wear detection apparatus comprising:
    a tire side device disposed on each of a plurality of tires of a vehicle, the tire side device including
        an acceleration sensor configured to output a detection signal according to a magnitude of vibration of a corresponding tire of the plurality of tires,
        a processor configured to estimate a vehicle speed that is a speed of the vehicle,
        a microcontroller configured to generate wear data indicating a tire wear state of the corresponding tire that appears in a waveform of the detection signal, and
        a first antenna configured to transmit the wear data; and
    wherein the microcontroller is configured to
        determine a detection signal acquiring range of the detection signal based on the vehicle speed estimated by the processor,
        calculate a length of time required for the corresponding tire to make one rotation based on the vehicle speed estimated by the processor,
        acquire, from the acceleration sensor, the detection signal continually for the calculated length of time required for the corresponding tire to make one rotation, and
        calculate, as the wear data, a vibration level of the acquired detection signal within a predetermined frequency range that is based on a natural frequency of the corresponding tire which includes a rubber block,
    a vehicle body side system disposed in a vehicle body and including
        a second antenna configured to receive the wear data, and
        a controller configured to determine the tire wear state based on the wear data and to transmit the tire wear state to a brake electronic control unit, and
        wherein the brake electronic control unit performs vehicle motion control of the vehicle based on the transmitted tire wear state.

2. The tire wear detection apparatus according to claim 1, wherein
    the acceleration sensor is configured to output, as the detection signal, a signal according to vibration of the corresponding tire in a radial direction, a normal direction, or a width direction of the corresponding tire.

3. The tire wear detection apparatus according to claim 1, wherein
    the controller is configured to acquire vehicle information related to a traveling state of the vehicle, and to determine the tire wear state based on the wear data and additionally based on the vehicle information acquired by the controller.

4. The tire wear detection apparatus according to claim 1, wherein
the vehicle information includes at least one of vehicle speed information, acceleration information, steering information, road surface information, tire pressure information, load information, weather information, location information, or temperature information,
effective data is selected from the wear data based on the vehicle information, and
the tire wear state is determined based on the selected wear data.

5. The tire wear detection apparatus according to claim 1, wherein
the microcontroller is further configured to:
acquire the detection signal indicating a vibration waveform of the corresponding tire,
extract a vibration component within the predetermined frequency range from the acquired detection signal, and
calculate an integrated level value that is an integral value of the vibration level of the extracted vibration component within the predetermined frequency range, and
the wear data is the integrated level value.

6. The tire wear detection apparatus according to claim 5, wherein
bidirectional communication is performed between the tire side device and the vehicle body side system by the first antenna and the second antenna,
the controller is further configured to estimate an accumulated time of solar irradiation to the corresponding tire,
the vehicle body side system is configured to transmit information about the accumulated time of solar irradiation, and
the microcontroller is further configured to correct a filter constant based on the accumulated time of solar irradiation.

7. The tire wear detection apparatus according to claim 6, wherein
the microcontroller is further configured to perform, as the correction of the filter constant, a correction to increase a cutoff frequency as the accumulated time of solar irradiation is longer.

8. The tire wear detection apparatus according to claim 6, wherein
the controller is further configured to acquire at least one of detection signal information of a solar irradiance sensor, an image information of a camera, a map information, a weather information, a time information, a vehicle orientation information, or a tire position information, and to estimate the accumulated time of solar irradiation based on the acquired information.

9. The tire wear detection apparatus according to claim 5, wherein
bidirectional communication between the tire side device and the vehicle body side system is performed by the first antenna and the second antenna,
the controller is further configured to estimate an accumulated time of solar irradiation to the corresponding tire,
the vehicle body side system is configured to transmit information about the accumulated time of solar irradiation, and
the microcontroller is further configured to correct an integral value based on the accumulated time of solar irradiation.

10. The tire wear detection apparatus according to claim 9, wherein
the microcontroller is further configured to perform, as the correction of the integral value, a correction to decrease the integral value as the accumulated time of solar irradiation is longer.

11. The tire wear detection apparatus according to claim 5, wherein
the controller is further configured to estimate an accumulated time of solar irradiation to the corresponding tire, and to determine the tire wear state by comparing the level value with a threshold value and correct the threshold value based on the accumulate time of solar irradiation.

12. The tire wear detection apparatus according to claim 1, wherein
the controller is further configured to determine the tire wear state by comparing the level value with a threshold value.

13. The tire wear detection apparatus according to claim 1, wherein
the controller is further configured to set an initial value of the level value, the initial value corresponding to the level value of the corresponding tire that has not worn, to normalize the level value indicated by the wear data based on the initial value, and determine the tire wear state based on the normalized value.

14. A tire wear detection apparatus configured to detect a tire wear state, the tire wear detection apparatus comprising:
an acceleration sensor configured to output a detection signal according to magnitude of vibration of a tire;
a processor configured to estimate a vehicle speed that is a speed of a vehicle;
a microcontroller configured to generate wear data indicating a wear state of the tire that appears in a waveform of the detection signal; and
wherein the microcontroller is configured to
determine a detection signal acquiring range of the detection signal based on the vehicle speed estimated by the processor,
calculate a length of time required for the corresponding tire to make one rotation based on the vehicle speed estimated by the processor,
acquire, from the acceleration sensor, the detection signal continually for the calculated length of time required for the corresponding tire to make one rotation, and
calculate, as the wear data, a vibration level of the acquired detection signal within a predetermined frequency range that is based on a natural frequency of the corresponding tire which includes a rubber block, and
a controller configured to determine the tire wear state based on the wear data and to transmit the tire wear state to a brake electronic control unit, and
wherein the brake electronic control unit performs vehicle motion control of the vehicle based on the transmitted tire wear state.

* * * * *